United States Patent
Swaminathan et al.

(10) Patent No.: US 11,106,944 B2
(45) Date of Patent: Aug. 31, 2021

(54) SELECTING LOGO IMAGES USING MACHINE-LEARNING-LOGO CLASSIFIERS

(71) Applicant: Adobe Inc., San Jose, CA (US)

(72) Inventors: Viswanathan Swaminathan, Saratoga, CA (US); Saayan Mitra, San Jose, CA (US); Han Guo, San Jose, CA (US)

(73) Assignee: Adobe Inc., San Jose, CA (US)

( * ) Notice: Subject to any disclaimer, the term of this patent is extended or adjusted under 35 U.S.C. 154(b) by 125 days.

(21) Appl. No.: 16/557,330

(22) Filed: Aug. 30, 2019

(65) Prior Publication Data

US 2021/0064934 A1    Mar. 4, 2021

(51) Int. Cl.
*G06K 9/62* (2006.01)
*G06N 20/00* (2019.01)
*G06N 3/08* (2006.01)

(52) U.S. Cl.
CPC .......... *G06K 9/6262* (2013.01); *G06K 9/627* (2013.01); *G06K 9/6256* (2013.01); *G06N 3/08* (2013.01); *G06N 20/00* (2019.01)

(58) Field of Classification Search
CPC .... G06K 9/6262; G06K 9/627; G06K 9/6256; G06N 3/08; G06N 20/00
USPC ...................................................... 382/156
See application file for complete search history.

(56) References Cited

U.S. PATENT DOCUMENTS

| 2018/0307942 A1* | 10/2018 | Pereira | G06K 9/6267 |
| 2020/0090007 A1* | 3/2020 | Joseph | G06K 9/3233 |
| 2020/0356818 A1* | 11/2020 | Attorre | G06K 9/4628 |

OTHER PUBLICATIONS

Hang Su, Shaogang Gong, Xiatian Zhu, et al., "Weblogo-2m: Scalable logo detection by deep learning from the web," 2018.
Yizhang Xia, Jing Feng, and Bailing Zhang, "Vehicle logo recognition and attributes prediction by multi-task learning with cnn," in Natural Computation, Fuzzy Systems and Knowledge Discovery (ICNC-FSKD), 2016 12th International Conference on. IEEE, 2016, pp. 668-672.
Chun Pan, Zhiguo Yan, Xiaoming Xu, Mingxia Sun, Jie Shao, and Di Wu, "Vehicle logo recognition based on deep learning architecture in video surveillance for intelligent traffic system," 2013.
(Continued)

*Primary Examiner* — Juan A Torres
(74) *Attorney, Agent, or Firm* — Keller Jolley Preece

(57) ABSTRACT

This disclosure relates to methods, non-transitory computer readable media, and systems that can initially train a machine-learning-logo classifier using synthetic training images and incrementally apply the machine-learning-logo classifier to identify logo images to replace the synthetic training images as training data. By incrementally applying the machine-learning-logo classifier to determine one or both of logo scores and positions for logos within candidate logo images, the disclosed systems can select logo images and corresponding annotations indicating positions for ground-truth logos. In some embodiments, the disclosed systems can further augment the iterative training of a machine-learning-logo classifier to include user curation and removal of incorrectly detected logos from candidate images, thereby avoiding the risk of model drift across training iterations.

20 Claims, 12 Drawing Sheets

(56) References Cited

OTHER PUBLICATIONS

Stefan Romberg and Rainer Lienhart, "Bundle min-hashing for logo recognition," in Proceedings of the 3rd ACM conference on International conference on multimedia retrieval. ACM, 2013, pp. 113-120.
Stefan Romberg, Lluis Garcia Pueyo, Rainer Lienhart, and Roelof Van Zwol, "Scalable logo recognition in real-world images," in Proceedings of the 1st ACM International Conference on Multimedia Retrieval. ACM, 2011, p. 25.
Yasir Ali Soomro and Rehan Shakoor, "Impact of logo on consumer perception of a company," Interdisciplinary Journal of Contemporary Research in Business, vol. 3, No. 7, pp. 61-81, 2011.
Vaishali S Jabade and Sachin R Gengaje, "Logo based image copyright protection using discrete wavelet transform and fuzzy inference system," International Journal of Computer Applications, vol. 58, No. 10, 2012.
Yuan Yuan, Decai Huang, and Duanyang Liu, "An integer wavelet based multiple logo-watermarking scheme," in Computer and Computational Sciences, 2006. IMSCCS'06. First International Multi-Symposiums on. IEEE, 2006, vol. 2, pp. 175-179.
Yoon-Hee Choi and Tae-Sun Choi, "Robust logo embedding technique for copyright protection," in Consumer Electronics, 2005. ICCE. 2005 Digest of Technical Papers. International Conference on. IEEE, 2005, pp. 341-342.
Hang Su, Xiatian Zhu, and Shaogang Gong, "Open logo detection challenge," arXiv preprint arXiv:1807.01964, 2018.
Andras Tuzko, Christian Herrmann, Daniel Manger, and Jürgen Beyerer, "Open set logo detection and retrieval," arXiv preprint arXiv:1710.10891, 2017.
Zhong-Qiu Zhao, Peng Zheng, Shou-tao Xu, and Xindong Wu, "Object detection with deep learning: A review," IEEE transactions on neural networks and learning systems, 2019.
Ross Girshick, "Fast r-cnn," in Proceedings of the IEEE international conference on computer vision, 2015, pp. 1440-1448.
Shaoqing Ren, Kaiming He, Ross Girshick, and Jian Sun, "Faster r-cnn: Towards real-time object detection with region proposal networks," in Advances in neural information processing systems, 2015, pp. 91-99.
Wei Liu, Dragomir Anguelov, Dumitru Erhan, Christian Szegedy, Scott Reed, Cheng-Yang Fu, and Alexander C Berg, "Ssd: Single shot multi-box detector," in European conference on computer vision. Springer, 2016, pp. 21-37.
Joseph Redmon, Santosh Divvala, Ross Girshick, and Ali Farhadi, "You only look once: Unified, real-time object detection," in Proceedings of the IEEE conference on computer vision and pattern recognition, 2016, pp. 779-788.
Kaiming He, Xiangyu Zhang, Shaoqing Ren, and Jian Sun, "Spatial pyramid pooling in deep convolutional networks for visual recognition," in European conference on computer vision. Springer, 2014, pp. 346-361.
Jifeng Dai, Yi Li, Kaiming He, and Jian Sun, "R-fcn: Object detection via region-based fully convolutional networks," in Advances in neural information processing systems, 2016, pp. 379-387.
Tsung-Yi Lin, Piotr Dona' r, Ross Girshick, Kaiming He, Bharath Hariharan, and Serge Belongie, "Feature pyramid networks for object detection," in CVPR, 2017, vol. 1, p. 4.
Kaiming He, Georgia Gkioxari, Piotr Dona' r, and Ross Girshick, "Mask r-cnn," in Computer Vision (ICCV), 2017 IEEE International Conference on. IEEE, 2017, pp. 2980-2988.
Joseph Redmon and Ali Farhadi, "Yolo9000: better, faster, stronger," arXiv preprint, 2017.
Cheng-Yang Fu, Wei Liu, Ananth Ranga, Ambrish Tyagi, and Alexander C Berg, "Dssd: Deconvolutional single shot detector," arXiv preprint arXiv:1701.06659, 2017.
Zhiqiang Shen, Zhuang Liu, Jianguo Li, Yu-Gang Jiang, Yurong Chen, and Xiangyang Xue, "Dsod: Learning deeply supervised object detectors from scratch," in The IEEE International Conference on Computer Vision (ICCV), 2017, vol. 3, p. 7.

Alexis Joly and Olivier Buisson, "Logo retrieval with a contrario visual query expansion," in Proceedings of the 17th ACM international conference on Multimedia. ACM, 2009, pp. 581-584.
Yannis Kalantidis, Lluis Garcia Pueyo, Michele Trevisiol, Roelof van Zwol, and Yannis Avrithis, "Scalable triangulation-based logo recognition," in Proceedings of the 1st ACM International Conference on Multimedia Retrieval. ACM, 2011, p. 20.
Hang Su, Xiatian Zhu, and Shaogang Gong, "Deep learning logo detection with data expansion by synthesising context," in Applications of Computer Vision (WACV), 2017 IEEE Winter Conference on. IEEE, 2017, pp. 530-539.
Steven CH Hoi, Xiongwei Wu, Hantang Liu, Yue Wu, Huigiong Wang, Hui Xue, and Qiang Wu, "Logo-net: Large-scale deep logo detection and brand recognition with deep region-based convolutional networks," arXiv preprint arXiv:1511.02462, 2015.
Xinlei Chen and Abhinav Gupta, "Webly supervised learning of convolutional networks," in Proceedings of the IEEE International Conference on Computer Vision, 2015, pp. 1431-1439.
Dong Li, Jia-Bin Huang, Yali Li, Shengjin Wang, and Ming-Hsuan Yang, "Weakly supervised object localization with progressive domain adaptation," in Proceedings of the IEEE Conference on Computer Vision and Pattern Recognition, 2016, pp. 3512-3520.
Parthipan Siva, Chris Russell, and Tao Xiang, "In defence of negative mining for annotating weakly labelled data," in European Conference on Computer Vision. Springer, 2012, pp. 594-608.
Sen Jia, Thomas Lansdall-Welfare, and Nello Cristianini, "Gender classification by deep learning on millions of weakly labelled images," in 2016 IEEE 16th International Conference on Data Mining Workshops (ICDMW). IEEE, 2016, pp. 462-467.
Zhiyuan Shi, Timothy M Hospedales, and Tao Xiang, "Bayesian joint topic modelling for weakly supervised object localisation," in Proceedings of the IEEE International Conference on Computer Vision, 2013, pp. 2984-2991.
Yong Xu, Qiuqiang Kong, Wenwu Wang, and Mark D Plumbley, "Large-scale weakly supervised audio classification using gated convolutional neural network," in 2018 IEEE International Conference on Acoustics, Speech and Signal Processing (ICASSP). IEEE, 2018, pp. 121-125.
Michael Sapienza, Fabio Cuzzolin, and Philip HS Torr, "Learning discriminative space—time action parts from weakly labelled videos," International journal of computer vision, vol. 110, No. 1, pp. 30-47, 2014.
Xingchao Peng, Baochen Sun, Karim Ali, and Kate Saenko, "Learning deep object detectors from 3d models," in Proceedings of the IEEE International Conference on Computer Vision, 2015, pp. 1278-1286.
Georgios Georgakis, Arsalan Mousavian, Alexander C Berg, and Jana Kosecka, "Synthesizing training data for object detection in indoor scenes," arXiv preprint arXiv:1702.07836, 2017.
Ankush Gupta, Andrea Vedaldi, and Andrew Zisserman, "Synthetic data for text localisation in natural images," in Proceedings of the IEEE Conference on Computer Vision and Pattern Recognition, 2016, pp. 2315-2324.
Kaiming He, Xiangyu Zhang, Shaoqing Ren, and Jian Sun, "Deep residual learning for image recognition," in Proceedings of the IEEE conference on computer vision and pattern recognition, 2016, pp. 770-778.
Tsung-Yi Lin, Michael Maire, Serge Belongie, James Hays, Pietro Perona, Deva Ramanan, Piotr Dolla'r, and C Lawrence Zitnick, "Microsoft coco: Common objects in context," in European conference on computer vision. Springer, 2014, pp. 740-755.
Emmanuel J Candes, Xiaodong Li, Yi Ma, and John Wright, "Robust principal component analysis?," Journal of the ACM (JACM), vol. 58, No. 3, pp. 11, 2011.
Praneeth Netrapalli, UN Niranjan, Sujay Sanghavi, Animashree Anandkumar, and Prateek Jain, "Non-convex robust pca," in Advances in Neural Information Processing Systems, 2014, pp. 1107-1115.
Han Guo, Chenlu Qiu, and Namrata Vaswani, "An online algorithm for separating sparse and low-dimensional signal sequences from their sum," IEEE Transactions on Signal Processing, vol. 62, No. 16, pp. 4284-4297, 2014.

(56) References Cited

OTHER PUBLICATIONS

Jiashi Feng, Huan Xu, and Shuicheng Yan, "Online robust pca via stochastic optimization," in Advances in Neural Information Processing Systems, 2013, pp. 404-412.

Yigang Peng, Arvind Ganesh, John Wright, Wenli Xu, and Yi Ma, "Rasl: Robust alignment by sparse and low-rank decomposition for linearly correlated images," IEEE transactions on pattern analysis and machine intelligence, vol. 34, No. 11, pp. 2233-2246, 2012.

* cited by examiner

SELECTING LOGO IMAGES USING MACHINE-LEARNING-LOGO CLASSIFIERS

BACKGROUND

Software developers and engineers have designed logo-detection systems to automatically detect logos within digital images and identify positions of such logos within the digital images. Detected logos may correspond to different logo classes, such as a logo for a specific automobile company and a logo for a specific clothing company. In practice, logo-detection systems have been applied to recognize vehicles for intelligent traffic control, recognize logos to address consumer confusion or perception, or detect use of a trademark or trade dress. To train a machine-learning model to detect logos and corresponding logo positions, some logo-detection systems use synthetic images or weakly labelled real images lacking ground-truth data for logos within images. Despite significant advances in logo detection, computing limitations inhibit existing logo-detection systems from accurately detecting logos in real images, developing real images with corresponding ground-truth data, and scaling a sample of real logo images to train machine-learning models. Some existing logo-detection systems also apply training algorithms that foment model drift during the training of machine-learning models.

In some cases, for example, conventional closed-set-logo-detection systems cannot develop (or train on) sufficient samples of real logo images with corresponding ground truths to accurately detect logos of certain logo classes. Because annotating real-world images that display logos can be time consuming and computationally expensive, some conventional techniques cannot produce, in practice, a critical volume of such images to accurately train a logo-detection system. Rather than rely on real-world images for training, some existing logo-detection systems train on synthetic images and consequently often fail to train the system to consistently classify logos within real-world images with accuracy. Indeed, certain logos lack sufficient corresponding real-world images to train a machine-learning model. Because such annotation is impractically cumbersome and real-world images of certain logos are sparse, some existing logo-detection systems also cannot train a machine-learning model to accurately detect or identify a position of a logo for certain logo classes.

In addition to inaccurate detection, some existing logo-detection systems inaccurately train a machine-learning model by failing to detect or correct model drift. When a machine-learning model incorrectly detects a logo within an input image—by, for example, falsely detecting a logo or failing to detect the presence of the logo—the logo-detection system can adjust or maintain internal parameters of the machine-learning model to reinforce such errors. By propagating errors in logo prediction through training iterations, the machine-learning model can drift to configure parameters to repeat such errors in future logo classifications.

Independent of inaccurate detections or model-drifting training, some logo-detection systems train multi-logo classifiers to detect logos within real images, but with rigid application and without ground-truth data. In some cases, for example, logo-detection systems train a multi-logo classifier to detect a fixed number of logo classes based on weakly labelled real images. Having once trained the multi-logo classifier, such an existing logo-detection system cannot subsequently add logo classes to expand the logo classes detected by the multi-logo classifier.

SUMMARY

This disclosure describes one or more embodiments of methods, non-transitory computer readable media, and systems that solve the foregoing problems in addition to providing other benefits. In particular, the disclosed systems can train a machine-learning-logo classifier using synthetic training images and incrementally apply the machine-learning-logo classifier to identify logo images to replace the synthetic training images as training data. Specifically, the disclosed systems can generate and utilize synthetic training images that portray logos from a logo class to initially train a machine-learning-logo classifier. The disclosed systems can then utilize the machine-learning-logo-classifier to select logo images from real-world images. In addition, the disclosed systems can incrementally replace the synthetic training images with the selected logo images and re-train the machine-learning-logo-classifier with the revised training set. By incrementally re-training and applying the machine-learning-logo classifier, the disclosed systems can select a set of accurate logo images and corresponding annotations indicating logo positions. In some embodiments, the disclosed systems can further augment the iterative training of a machine-learning-logo classifier to include user curation and removal of incorrectly detected logos from candidate images, thereby avoiding the risk of model drift across training iterations.

The following description sets forth additional features and advantages of the disclosed methods, non-transitory computer readable media, and systems.

BRIEF DESCRIPTION OF THE DRAWINGS

The detailed description refers to the drawings briefly described below.

DETAILED DESCRIPTION

Figure 1:
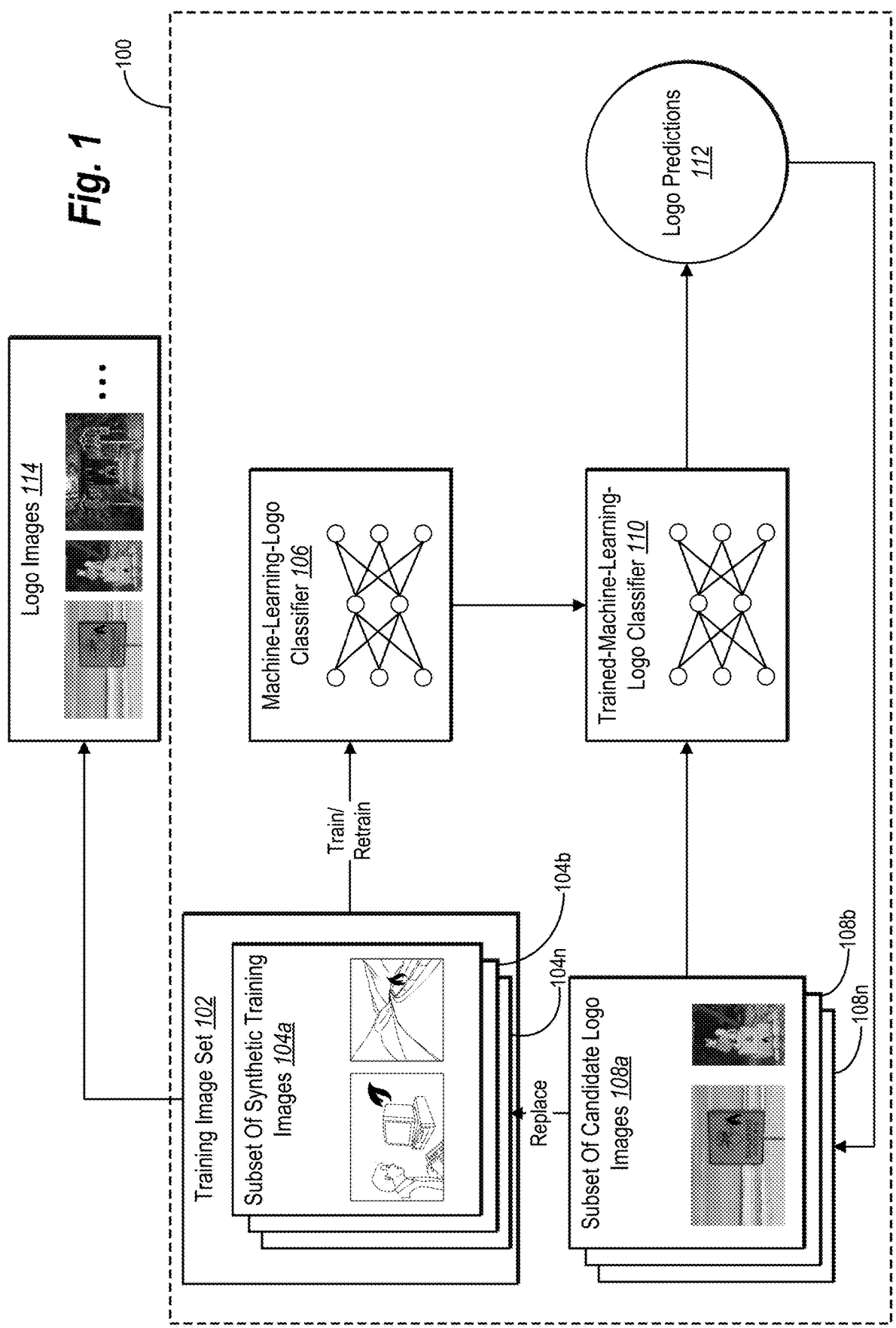
FIG. 1 illustrates a logo-detection-training system training a machine-learning-logo classifier based on synthetic training images and incrementally replacing the synthetic training images with logo images in accordance with one or more embodiments.

This disclosure describes one or more embodiments of a logo-detection-training system that selects logo images comprising ground-truth logos corresponding to a logo class by initially training a machine-learning-logo classifier using synthetic training images and iteratively applying the machine-learning-logo classifier to identify logo images as replacements for the synthetic training images. To identify logo images and corresponding annotations for ground-truth-logo positions, the logo-detection-training system can apply the machine-learning-logo classifier to determine logo scores indicating predicted logos within candidate logo images and boundary identifiers for predicted logos within the candidate logo images. By augmenting the iterative training of a machine-learning-logo classifier to include user curation and removal of incorrectly detected logos from candidate logo images via a curation user interface, the disclosed logo-detection-training system can further avoid model drift across training iterations.

In some embodiments, for instance, the logo-detection-training system generates a set of synthetic training images portraying logos from a particular logo class and trains a machine-learning-logo classifier based on the synthetic training images. The logo-detection-training system can further apply the machine-learning-logo classifier to candidate logo images to select a subset of logo images. Upon identifying the subset of logo images, the logo-detection-training system can replace a subset of the synthetic training images with the subset of logo images to generate a set of mixed training images. Based on the set of mixed training images, the logo-detection-training system can retrain the machine-learning-logo classifier. By incrementally replacing the synthetic training images with selected candidate logo images, the logo-detection-training system can select logo images comprising ground-truth logos corresponding to the logo class using the retrained machine-learning-logo classifier.

As just mentioned, in some embodiments, the logo-detection-training system generates and utilizes synthetic training images to initially train a machine-learning-logo classifier. For example, the logo-detection-training system can generate synthetic training images by inserting a logo from a logo-class as an overlay to an existing digital image. The logo-detection-training system can select a size, orientation, and location of the logo within the digital image and then apply the logo to generate a synthetic training image. Because the boundary of the logo within the synthetic training image is known, the logo-detection-training system can then train the machine-learning-logo classifier based on the synthetic training images and known boundary identifiers.

Utilizing the machine-learning-logo classifier trained from the synthetic training images, the logo-detection system can identify logo images comprising ground-truth logos from a selected set of candidate logo images. To select candidate logo images, in some embodiments, the logo-detection-training system identifies images from image-search results related to a logo class. For instance, the logo-detection-training system can utilize a search engine to conduct a query for the logo class and utilize the search results as the set of candidate logo images.

As mentioned, upon identifying candidate logo images, the logo-detection system can apply the machine-learning-logo classifier to incrementally determine a set of logo images from the candidate logo images. For example, the logo-detection-training system can apply a machine-learning-logo classifier to candidate logo images to determine logo scores for such candidate images, where a logo score indicates a likelihood that a candidates-ground-truth-logo image portrays a logo corresponding to a logo class. In addition to (or in combination with) such logo scores, in some cases, the machine-learning-logo classifier further determines boundary identifiers indicating positions of candidate logos within the candidate logo images.

Utilizing the identified logo images, the logo-detection-training system can re-train the machine-learning-logo classifier. Specifically, the logo-detection-training system can identify the synthetic images utilized to initially train the machine-learning-logo classifier and replace a subset of the synthetic images with the identified logo images. In replacing a subset of the synthetic images, the logo-detection-training system can generate a mixed training set of synthetic training images and real (non-synthetic) images. The logo-detection-training system can utilize this mixed set of training images to re-train the machine-learning-logo classifier.

The logo-detection-training system can iteratively perform this process to identify an increasing number of logo images. Indeed, the logo-detection-training system can repeatedly train a machine-learning-logo classifier, identify additional logo images, replace synthetic images in the training set with the identified logo images, and re-train the machine-learning-logo classifier. In some embodiments, the logo-detection-training system repeats this process until all of the synthetic training images have been replaced with logo images (e.g., real images portraying logos from the logo class).

As suggested above, the logo-detection-training system can augment or supplement training of a machine-learning-logo classifier to include user curation and removal of incorrectly detected logos from candidate images. For instance, in some embodiments, the logo-detection-training system provides candidate logos from a subset of candidate logo images in a curation user interface for display on a computing device. Such a curation user interface may further include logo-rejection options corresponding to the subset of candidate logo images. Upon receiving an indication of user selection of a logo-rejection option, the logo-detection-training system can remove a corresponding candidate logo image from the subset of candidate logo images.

By removing rejected images from a subset, the logo-detection-training system can employ user curation to select a more accurate subset of candidate logo images for replacing a corresponding subset of synthetic training images in a given training iteration or training epoch. Upon incrementally replacing subsets of synthetic training images with corresponding subsets of candidate logo images, in certain implementations, the logo-detection-training system replaces the synthetic training images with logo images comprising ground-truth logos (and boundary identifiers for such logos) corresponding to a logo class.

The logo-detection-training system can further select and use logo images corresponding to different logo classes to train a multi-logo-classification model. For example, the logo-detection-training system may select a first set of logo images using a first machine-learning-logo classifier and a second set of logo images using a second machine-learning-logo classifier. In one or more embodiments, the logo-detection-training system further trains a multi-logo-classification model to detect logos corresponding to different logo classes based on the first and second sets of logo images. By further training machine-learning-logo classifiers—and selecting corresponding logo images specific to any number of different logo classes—the logo-detection-training system can also retrain the multi-logo-classification model to detect logos corresponding to additional logo classes.

As suggested above, the logo-detection-training system overcomes several technical deficiencies that hinder conventional logo-detection systems. For example, the logo-detection-training system identifies a set of ground-truth training data that previous logo-detection systems could not identify or use for training. Unlike synthetic images or weakly labelled real images, the logo-detection-training system can select logo images with corresponding annotations for one or both of a particular logo and logo positioning. Rather than rely on computationally expensive and time-consuming manual annotation of real images like some conventional logo-detection systems, the logo-detection-training system can iteratively replace synthetic training images with logo images in either an automatic training pipeline or semi-automatic training pipeline with user curation. The logo-detection-training system accordingly can scale logo images to thousands or hundreds of thousands (or more) to accurately train a machine-learning-logo classifier for a particular logo class at a scale that manual annotations cannot replicate.

Based in part on the scalability of the disclosed logo images, the logo-detection-training system improves the accuracy with which logo-detection systems recognize logos corresponding to a particular logo class. Rather than train a machine-learning model on doctored synthetic images or an insufficient (or unrepresentative) collection of real logo images, the logo-detection-training system selects logo images upon which a machine-learning-logo classifier (or multi-logo-classification model) can train to more accurately detect logos of a particular class or logo positions within images. The logo-detection-training system can accordingly facilitate training (or directly train) a machine-learning-logo classifier with logo images to more precisely detect logos in real-world applications than conventional logo-detection systems. As suggested above, such real-word applications range from intelligent traffic control to trademark or trade dress infringement.

In addition to improved logo detection, in some embodiments, the logo-detection-training system also applies a semi-automatic iterative training process that safeguards against model drift. Rather than propagating logo-detection errors through internal parameters of a machine-learning model, the logo-detection-training system can supplement the training process with user curation via a user curation interface. The disclosed user curation interface facilitates removing incorrectly detected candidate logos from candidate logo images. Such a user curation interface introduces flexibility into a training pipeline that conventional systems traditionally applied with rigidity to propound detection errors. As described below, the user-friendly curation interface expeditiously facilitates curation of candidate logo images to avoid false-negative detection and false-positive detection of logos by a machine-learning-logo classifier.

Independent of avoiding model drift, in certain implementations, the logo-detection-training system also increases the flexibility with which a multi-logo-classification model can expand and detect logos corresponding to additional logo classes. Unlike the one-and-done training process of existing multi-logo classifiers, the logo-detection-training system introduces a flexible training process that can incrementally add logo images of particular logo classes and additional logo-class-detection capabilities to a multi-logo-classification model. By separately training and applying machine-learning-logo classifiers specific to respective logo classes, the logo-detection-training system can select logo images specific to such logo classes for training of a multi-logo-classification model.

As indicated by the foregoing description, this disclosure uses a variety of terms to describe features and advantages of the logo-detection-training system. As used in this disclosure, the term "logo" refers to a design, emblem, stylized graphic, symbol, or other graphical representation of a brand, corporation, organization, product, person, service, object, item, or entity. For example, a logo may refer to a specific instance or occurrence of a graphic design or graphic symbol of a brand, corporation, product, service, or entity. To provide but a few examples, a logo may be specific to and represent a company; a brand of beverage, clothing, or eating establishment; store or exchange; or university. Relatedly, the term "logo class" refers to a particular type of logo. A logo class may accordingly refer to a type of logo particular to a company, brand, product, or service. A company or brand can likewise have multiple logos. In some embodiments, a logo class therefore includes multiple copies, instances, or occurrences of a particular logo. A logo class for Adobe Acrobat, for example, may include multiple instances or occurrences of the distinctive logo for Adobe Acrobat. Although many examples provided in this disclosure reflect symbols or brands for different entities, the logo-detection-training system can apply a machine-learning-logo classifier to select logo images comprising ground-truth logos and identify a variety of objects and corresponding object classes portrayed in digital images.

The term "synthetic training image" refers to a digital image altered to include or portray a logo. In particular, in some cases, a synthetic training image refers to a digital image on which a logo is digitally overlaid or superimposed. Accordingly, a synthetic training image may include an instance or occurrence of a logo in a location (or on an object) that would not typically comprise a logo in a real-world application—depending on the image and location of the logo during digital alteration. A synthetic training image may likewise include or correspond to a boundary identifier indicating a position of the logo within the image.

By contrast, the term "candidate logo image" refers to a digital image analyzed to determine if or whether it contains a logo (e.g., a digital image where it is unknown whether the image contains a logo). In particular, a candidate logo image can include an original or real (e.g., non-synthetic) digital image from a repository of digital images that potentially portray a logo. As mentioned above, in some embodiments, a candidate logo image includes a digital image identified as a result of a search for digital images portraying a logo from a particular logo class.

Similarly, the term "logo image" refers to a digital image portraying a logo. In particular, a logo image includes an original or real (e.g., non-synthetic) digital image that portrays a logo and that corresponds to a digital annotation identifying ground-truth data for the logo. As just suggested, a logo image can correspond to ground-truth data that identifies one or both of a logo class and a position of a logo within the digital image (e.g., a boundary identifier). As described in greater detail below, the logo-detection-training system can identify logo images by selecting those candidate logo images that portray a logo corresponding to a logo class.

As used herein, a "machine learning model" refers to a computer representation or algorithm that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

As mentioned, a machine learning model can include a neural network. A neural network can include a model of interconnected artificial neurons (organized in layers) that communicate and learn to approximate complex functions and generate outputs based on a plurality of inputs provided to the model. In addition, a neural network is an algorithm (or set of algorithms) that implements deep learning techniques that utilize a set of algorithms to model high-level abstractions in data. For example, a neural network can include a convolutional neural network, a recurrent neural network, and/or a graph neural network.

As further suggested above, a "machine-learning-logo classifier" refers to a machine-learning model, such as an artificial neural network, trained to detect logos within images corresponding to a logo class. For instance, in some cases, a machine-learning-logo classifier refers to a machine-learning model trained to determine logo scores indicating a logo class for logos within images and boundary identifiers indicating positions of the logos within images. In some implementations, a machine-learning-logo classifier comprises a convolutional neural network ("CNN") trained to detect logos, as described above or below.

Additionally, the term "logo score" refers to a score indicating a measure of likelihood that an image includes a logo (e.g., a logo corresponding to a logo class). In some embodiments, for example, a logo score refers to a probability or other quantitative measure that an image (or particular pixels of an image) include a logo corresponding to a logo class. A logo score may include a single score for an image or a series of scores for pixels within an image (e.g., scores in a vector or matrix). Relatedly, a "boundary identifier" refers to an indication of a position of a logo within an image. For instance, a boundary identifier may refer to a bounding box, mask, or data annotation identifying a position of a logo within an image. In some cases, a logo score and a boundary identifier are part of a same output or representation from a machine-learning-logo classifier, such as scores in a vector or matrix indicating a likelihood that particular pixels/locations within a digital image portray a logo.

Turning now to FIG. 1, this figure illustrates a logo-detection-training system 100 incrementally replacing synthetic training images with logo images using a machine-learning-logo classifier in accordance with one or more embodiments. As depicted in FIG. 1, the logo-detection-training system 100 initially trains a machine-learning-logo classifier 106 using synthetic training images and subsequently applies a trained-machine-learning-logo classifier 110 to generate logo predictions 112 for candidate logo images. Based on the logo predictions 112, the logo-detection-training system 100 selects a subset of candidate logo images to replace a subset of synthetic training images, thereby generating a set of mixed training images. Based on the set of mixed training images, the logo-detection-training system 100 retrains the machine-learning-logo classifier 106. By iteratively replacing subsets of synthetic training images with subsets of candidate logo images, the logo-detection-training system 100 selects logo images 114 corresponding to a logo class.

As suggested above and shown in FIG. 1, the logo-detection-training system 100 initially trains the machine-learning-logo classifier 106 using a training image set 102 comprising subsets of synthetic training images 104a-104n. Each synthetic training image from the subsets of synthetic training images 104a-104n comprises a logo corresponding to a logo class. During the initial training, the training image set 102 includes the subsets of synthetic training images 104a-104n, but no candidate logo images.

To initially train the machine-learning-logo classifier 106, for example, the logo-detection-training system 100 applies the machine-learning-logo classifier 106 to generate logo predictions for each synthetic training image. Such a logo prediction may include a logo score and a boundary identifier for a logo within a synthetic training image. By iteratively generating and comparing logo predictions to ground-truth logos for each synthetic training image to determine a logo-prediction loss, the logo-detection-training system 100 adjusts the internal parameters of and trains the machine-learning-logo classifier 106.

After initially training the machine-learning-logo classifier 106, the logo-detection-training system 100 applies the trained-machine-learning-logo classifier 110 to candidate logo images to likewise generate the logo predictions 112. To identify the candidate logo images, the logo-detection-training system 100 can identify images from image-search results corresponding to search terms related to a logo class (e.g., a search for a name of a company corresponding to a logo class or a name of a logo for the logo class). For purposes of illustration, FIG. 1 depicts both the machine-learning-logo classifier 106 and the trained-machine-learning-logo classifier 110. But the machine-learning-logo classifier 106 and the trained-machine-learning-logo classifier 110 represent the same machine-learning-logo classifier at different stages of an iterative process.

As indicated by FIG. 1, the logo-detection-training system 100 applies the trained-machine-learning-logo classifier 110 to subsets of candidate logo images 108a-108n to generate the logo predictions 112. As indicated above, a logo prediction may include, for example, a logo score indicating a likelihood that a candidate logo image includes a logo corresponding to a logo class. A logo prediction for a candidate logo image may likewise include a boundary identifier indicating a position of the logo within the candidate logo image. To generate the logo predictions 112 in an initial application, the logo-detection-training system 100 accordingly generates a logo prediction for each candidate logo image from within the subsets of candidate logo images 108a-108n.

Based on logo scores from the logo predictions 112, the logo-detection-training system 100 selects a subset of candidate logo images as a subset of logo images to replace a subset of synthetic training images from within the training image set 102. For example, the logo-detection-training system 100 may identify and select candidate logo images corresponding to the highest logo scores (e.g., highest 100 or 1,000 logo scores). As indicated in FIG. 1, the logo-detection-training system 100 selects the subset of candidate logo images 108a (as a subset of logo images) after an initial application of the trained-machine-learning-logo classifier 110.

Upon selection, the logo-detection-training system utilizes the subset of candidate logo images 108a as a subset of logo images for replacing a subset of synthetic training images. Indeed, as shown in FIG. 1, the logo-detection-training system 100 replaces the subset of synthetic training images 104a with the subset of candidate logo images 108a. Upon such a replacement, the training image set 102 constitutes a set of mixed training images—including both synthetic training images and logo images.

As further indicated by FIG. 1, the logo-detection-training system 100 subsequently retrains the machine-learning-logo classifier 106 based on the training image set 102. The training image set 102 now comprises the subset of candidate logo images 108a, not the subset of synthetic training images 104a. In subsequent iterations, the logo-detection-training system 100 applies the trained-machine-learning-logo classifier 110 to candidate logo images to generate logo predictions. Based on logo scores from the logo predictions, the logo-detection-training system 100 selects a new subset of candidate logo images (as a new subset of logo images) and replaces an additional subset of synthetic training images (e.g., the subset of synthetic training images 104b) within the training image set 102.

As FIG. 1 illustrates, the logo-detection-training system 100 replaces the subsets of synthetic training images 104a-104n with various subsets of candidate logo images through multiple replacement iterations—until the training image set 102 includes no synthetic training images. In this manner, the logo-detection-training system 100 identifies the logo images 114.

Figure 2:
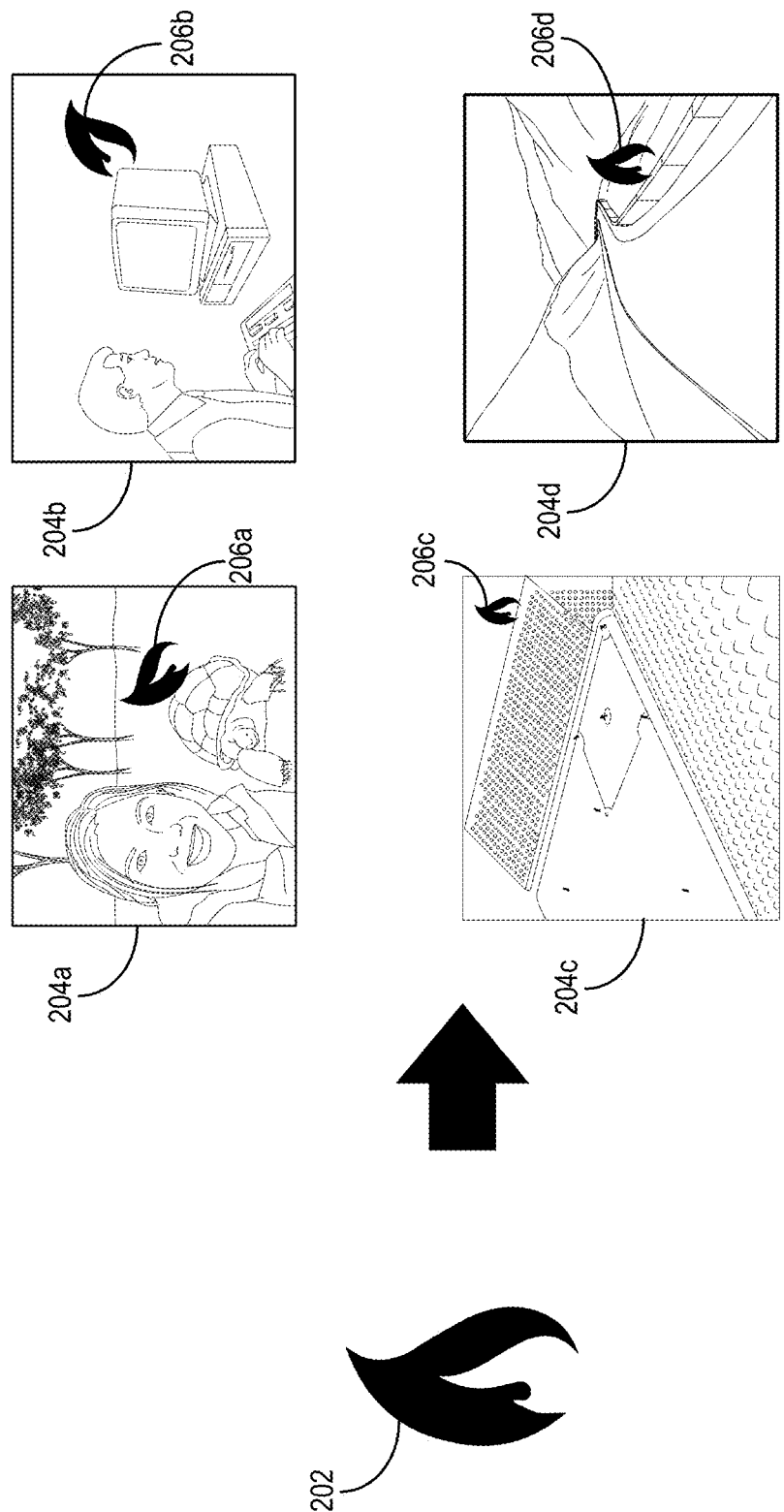
FIG. 2 illustrates the logo-detection-training system generating synthetic training images in accordance with one or more embodiments.

As suggested above, in certain implementations, the logo-detection-training system 100 generates synthetic training images as training inputs for a machine-learning-logo classifier. To generate a synthetic training image, the logo-detection-training system 100 can digitally alter a digital image to include a logo and digitally annotate the digital image to include a boundary identifier indicating a position of the logo (e.g., where metadata corresponding to the digital image includes a logo-class identifier and a boundary identifier). FIG. 2 illustrates an example of the logo-detection-training system 100 generating synthetic training images in accordance with one or more embodiments.

As shown in FIG. 2, the logo-detection-training system 100 digitally modifies images to include a copy of a logo 202 corresponding to a logo class. As suggested above, the logo 202 may correspond to a brand, corporation, product, service, or other entity. In some cases, the logo-detection-training system 100 overlays a copy of the logo 202 on a digital image as part of generating a synthetic training image. As shown in FIG. 2, for instance, the logo-detection-training system 100 overlays copies of the logo 206a-206d on four respective digital images as part of generating synthetic training images 204a-204d.

In addition to overlaying the copies of the logo 206a-206d, the logo-detection-training system 100 also identifies and records a position of each of the copies of the logo 206a-206d within the synthetic training images 204a-204d to generate corresponding boundary identifiers. In some cases, for instance, the logo-detection-training system 100 records a bounding box for each of the copies of the logo 206a-206d to generate a boundary identifier for each of the synthetic training images 204a-204d. Additionally, or alternatively, the logo-detection-training system 100 may identify a location of each pixel within the synthetic training images 204a-204d corresponding to the copies of the logo 206a-206d—or each pixel corresponding to a boundary of the copies of the logo 206a-206d—to generate boundary identifiers for the synthetic training images 204a-204d, respectively. For training purposes, the logo-detection-training system 100 attaches a logo class corresponding to the logo 202 and a boundary identifier as a ground-truth logo for each of the synthetic training images 204a-204d.

In addition (or in the alternative) to overlaying logos on digital images, the logo-detection-training system 100 may apply any suitable method of inserting or modifying a digital image to include a logo as part of generating a synthetic training image. For example, in certain implementations, the logo-detection-training system 100 may apply image-based blending or apply depth and semantic informed positioning of an object model into a real scene to digitally alter a digital image to include a copy of a logo. In some cases, the logo-detection-training system 100 applies any of the superimposition strategies described by Georgios Georgakis et al., "Synthesizing Training Data for Object Detection in Indoor Scenes," Robotics: Science and Systems (2017), the entire contents of which are incorporated by reference.

Figure 3A:
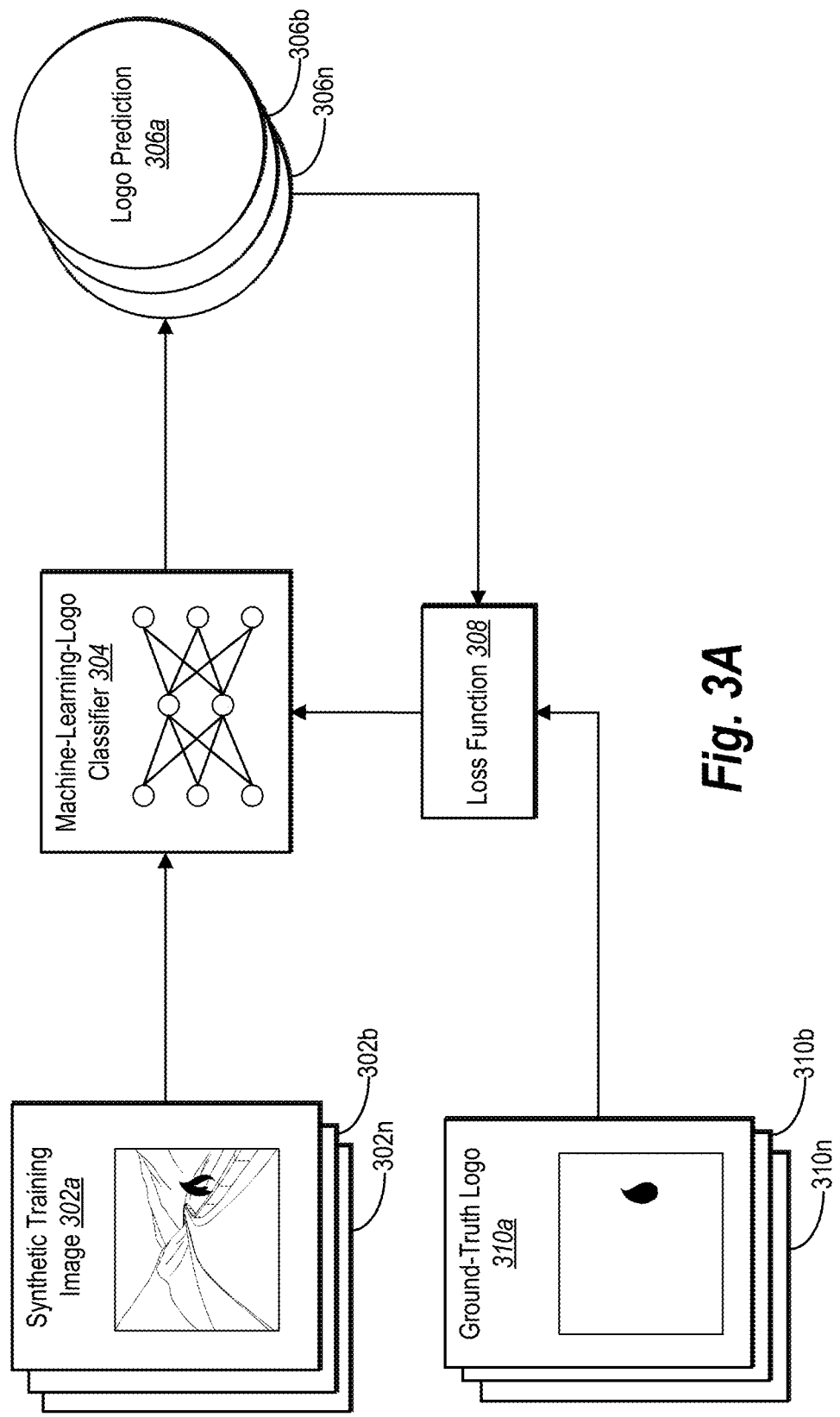
FIG. 3A illustrates the logo-detection-training system training a machine-learning-logo classifier using synthetic training images in accordance with one or more embodiments.
Figure 3B:
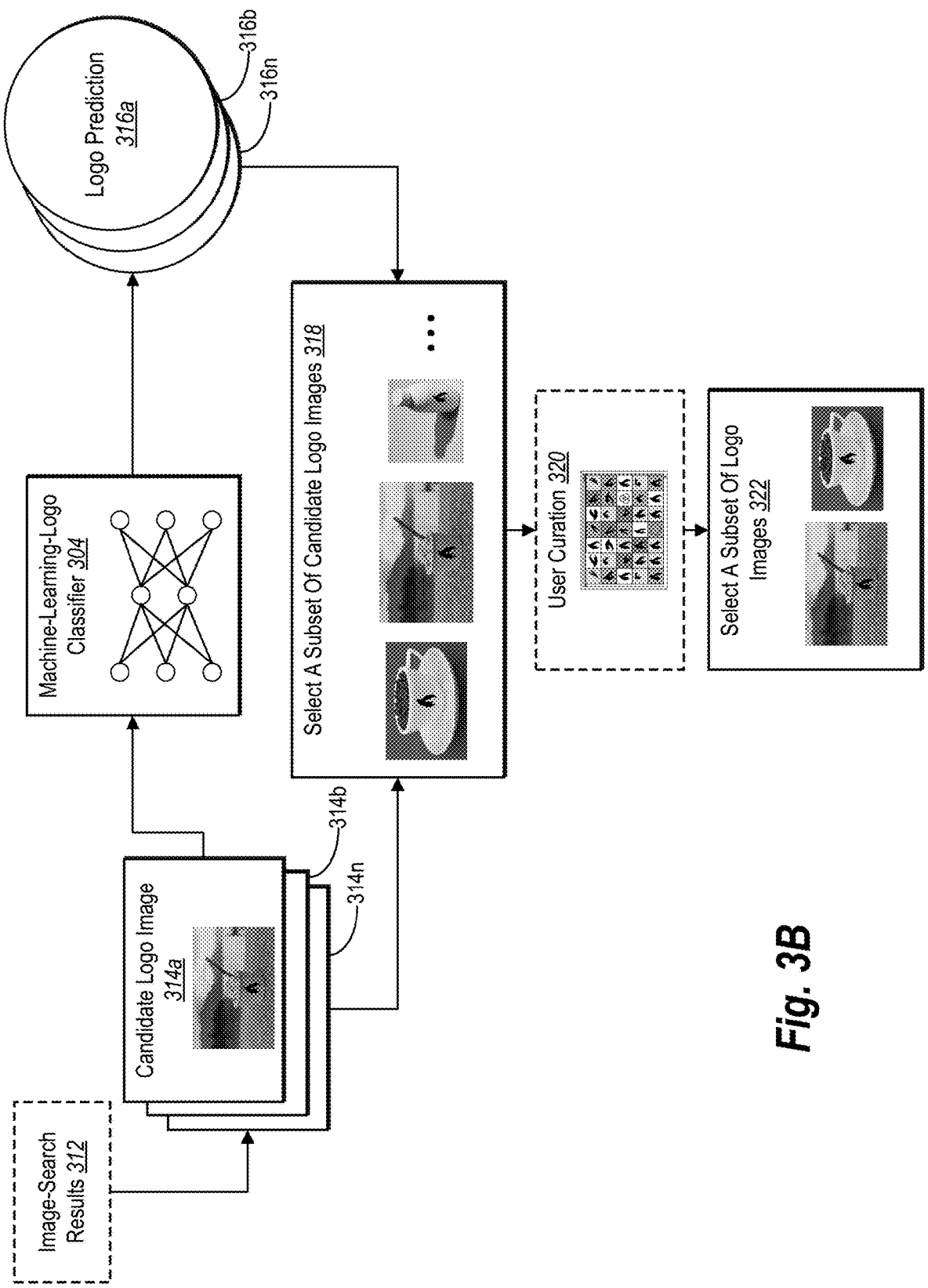
FIG. 3B illustrates the logo-detection-training system applying a machine-learning-logo classifier to candidate logo images and selecting a subset of logo images in accordance with one or more embodiments.
Figure 3C:
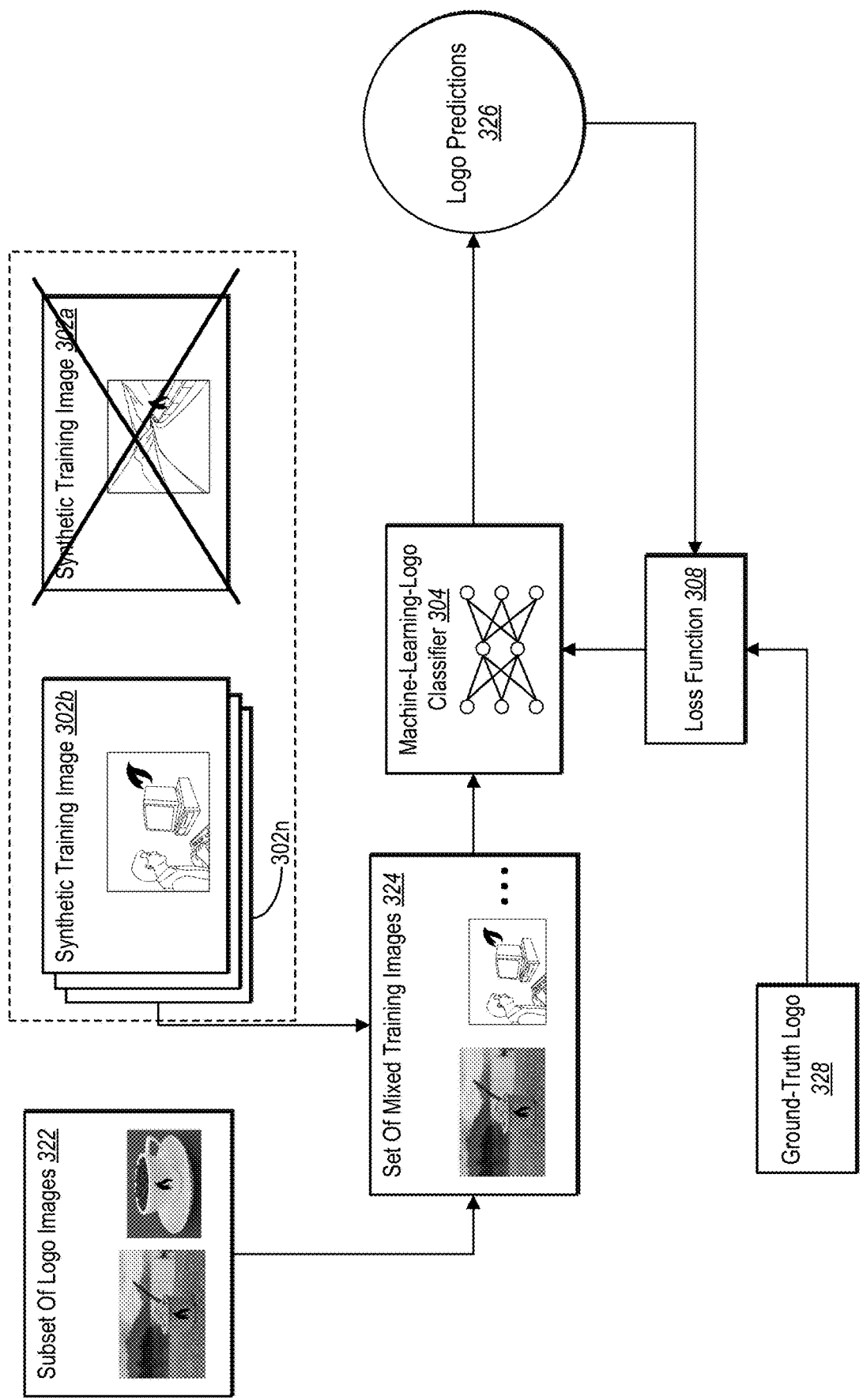
FIG. 3C illustrates the logo-detection-training system replacing a subset of synthetic training images with a subset of logo images to generate mixed training images and retraining the machine-learning-logo classifier based on the mixed training images in accordance with one or more embodiments.

As noted above, the logo-detection-training system 100 uses synthetic training images to train a machine-learning-logo classifier. FIGS. 3A-3C depict the logo-detection-training system 100 initially training a machine-learning-logo classifier using synthetic training images and incrementally applying the machine-learning-logo classifier to identify logo images to replace the synthetic training images in accordance with one or more embodiments. The following paragraphs describe each of FIGS. 3A-3C in turn.

As shown in FIG. 3A, the logo-detection-training system 100 iteratively applies a machine-learning-logo classifier 304 to generate logo predictions 306a-306n corresponding to a logo class for synthetic training images 302a-302n. The logo-detection-training system 100 further compares the logo predictions 306a-306n to ground-truth logos 310a-310n corresponding to the logo class to determine a logo-prediction loss from a loss function 308. Based on the determined logo-prediction loss, the logo-detection-training system 100 modifies internal parameters of the machine-learning-logo classifier 304. By iteratively generating and comparing logo predictions to ground-truth logos for each synthetic training image, the logo-detection-training system 100 adjusts the internal parameters for and trains the machine-learning-logo classifier 304 to detect logos within images corresponding to a particular logo class.

As depicted in FIG. 3A, the machine-learning-logo classifier 304 can comprise an artificial neural network. For example, in some embodiments, the logo-detection-training system 100 uses a Faster Region-Based CNN ("Faster R-CNN") or other CNN as the machine-learning-logo classifier 304. In particular, the logo-detection-training system 100 optionally utilizes a Faster R-CNN as described by Shaoqing Ren et al., "Faster R-CNN: Towards Real-Time Object Detection with Region Proposal Networks," *Advances in Neural Information Processing Systems* 91-99 (2015) (hereinafter, "Ren"), the entire contents of which are incorporated by reference. Alternatively, the logo-detection-training system 100 uses a Single Shot MultiBox Detector ("SSD"), a You-Only-Look-Once ("YOLO") detection system, or a Fast YOLO detection system as the machine-learning-logo classifier 304, as described by Wei Liu et al., "SSD: Single Shot MultiBox Detector," *European Conf. on Computer Vision* (2016) (hereinafter, "Liu"), the entire contents of which are incorporated by reference. But the logo-detection-training system 100 may use any suitable machine-learning model as the machine-learning-logo classifier 304.

As suggested above, the logo-detection-training system 100 iteratively inputs the synthetic training images 302a-302n into the machine-learning-logo classifier 304 as part of initial training. In an initial training iteration shown by FIG. 3A, for example, the logo-detection-training system 100 feeds the synthetic training image 302a to the machine-learning-logo classifier 304. Based on the synthetic training image 302a, the machine-learning-logo classifier 304 outputs the logo prediction 306a.

As suggested above, the logo prediction 306a may include one or both of a logo score and a boundary identifier. For example, in some embodiments, the logo prediction 306a includes a logo score indicating a likelihood that the synthetic training image 302a portrays a logo corresponding to a logo class. The logo prediction 306a may also include a boundary identifier indicating a position of the logo within the synthetic training image 302a. In some cases, the logo prediction 306a includes a box-classification score corresponding to a logo class as a logo score and a bounding box as a bounding box as a boundary identifier as described by Ren.

As indicated above, the machine-learning-logo classifier 304 may output the logo prediction 306a in a variety of formats depending on the layers of the machine-learning-logo classifier 304. For instance, in some embodiments, the machine-learning-logo classifier 304 outputs a matrix or an image map as the logo prediction 306a. In such a logo prediction, the matrix or the image map comprises a logo score corresponding to various locations (e.g., a score per pixel or a score per groups of pixels) within the synthetic training image 302a and the logo scores collectively indicate a boundary of the logo within the synthetic training images 302a as a boundary identifier. Alternatively, the logo prediction 306a includes an image mask indicating a boundary for a logo within the synthetic training image 302a and logo scores for portions not covered by the image mask.

After generating the logo prediction 306a, the logo-detection-training system 100 compares the logo prediction 306a to the ground-truth logo 310a. The ground-truth logo 310a corresponds to the synthetic training image 302a. As indicated above, in some embodiments, the ground-truth logo 310a includes a ground-truth-logo label with which the logo-detection-training system 100 compares a logo score (or collection of logo scores) from the logo prediction 306a. The ground-truth logo 310a may further include a ground-truth-boundary identifier with which the logo-detection-training system 100 compares a boundary identifier from the logo prediction 306a. Alternatively, the ground-truth logo 310a may include a ground-truth-logo label and a ground-truth matrix, a ground-truth-image map, or a ground-truth-image mask indicating a position of a logo within the synthetic training image 302a.

As further shown in FIG. 3A, in some embodiments, the logo-detection-training system 100 uses the loss function 308 to compare the logo prediction 306a and the ground-truth logo 310a and to determine a logo-prediction loss. To determine a logo-prediction loss, in some embodiments, the logo-detection-training system 100 determines a classification loss based on a comparison of a logo score and a ground-truth-logo label. In some cases, the logo-detection-training system 100 further determines a regression loss based on a comparison of a boundary identifier and a ground-truth-boundary identifier. For instance, in some implementations, the logo-detection-training system 100 implements the loss function 308 as an overall-loss function by determining (i) a classification loss for a logo score and a ground-truth-logo label using a log-loss function and (ii) a regression loss for a bounding box and a ground-truth-bounding box using a robust-loss function (e.g., Smooth L1) as described by Ren.

Alternatively, in some implementations, the logo-detection-training system 100 determines (i) a confidence loss based on a comparison of a logo score and a ground-truth-logo label using a softmax-loss function and (ii) a L1 loss (e.g., Smooth L1) based on a comparison of a bounding box and a ground-truth-bounding box as described by Liu. But the logo-detection-training system 100 can use any suitable loss function (or combination of loss functions) as the loss function 308. For instance, the logo-detection-training system 100 may use a binary-cross-entropy-loss function, cross-entropy-loss function, mean-squared-error-loss function, or other suitable loss function as the loss function 308. Such loss functions may likewise facilitate a comparison of a ground-truth matrix with a predicted matrix, a ground-truth-image map with a predicted image map, or a ground-truth-image mask with a predicted image mask.

Upon determining a logo-prediction loss from the loss function 308, the logo-detection-training system 100 modifies internal parameters (e.g., weights or values) of the machine-learning-logo classifier 304 to decrease a logo-prediction loss from the loss function 308 in a subsequent training iteration (e.g., using back propagation) as indicated by the arrow from the loss function 308 to the machine-learning-logo classifier 304. For example, the logo-detection-training system 100 may increase or decrease weights or values from some (or all) of a box-regression layer and a box-classification layer within a Faster R-CNN as the machine-learning-logo classifier 304 to decrease or minimize a loss in a subsequent training iteration. Additionally, or alternatively, the logo-detection-training system 100 may increase or decrease weights or values from convolutional layers within the machine-learning-logo classifier 304 to decrease or minimize a loss in a subsequent training iteration.

After modifying internal parameters of the machine-learning-logo classifier 304 for an initial training iteration, in certain implementations, the logo-detection-training system 100 performs additional training iterations. In a subsequent training iteration, for instance, the logo-detection-training system 100 generates a logo prediction 306b for the synthetic training image 302b. The logo-detection-training system 100 further compares the logo prediction 306b to a ground-truth logo 310b using the loss function 308 and modifies internal parameters of the machine-learning-logo classifier 304 based on a determined logo-prediction loss.

By iteratively determining logo-prediction losses from a comparison of logo predictions and ground-truth logos, the logo-detection-training system 100 trains the machine-learning-logo classifier 304 to classify logos corresponding to a particular logo class and to identify logo positions within synthetic training images. In some cases, the logo-detection-training system 100 performs training iterations until having output a logo prediction and determined a corresponding logo-prediction loss for each of the synthetic training images 302a-302n. Alternatively, in one or more embodiments, the logo-detection-training system 100 performs training iterations until the value or weights of the machine-learning-logo classifier 304 do not change significantly across training iterations or otherwise satisfy a convergence criteria.

As suggested above, after initially training the machine-learning-logo classifier 304, the logo-detection-training system 100 applies the machine-learning-logo classifier 304 to candidate logo images. In accordance with one or more embodiments, FIG. 3B illustrates an example of the logo-detection-training system 100 generating logo predictions 316a-316n for candidate logo images 314a-314n using the machine-learning-logo classifier 304. Based on logo scores from the logo predictions 316a-316n, the logo-detection-training system 100 subsequently selects a subset of candidate logo images 318. Upon optionally curating candidate logo images from the subset of candidate logo images 318, the logo-detection-training system 100 selects a subset of logo images 322 as training inputs for retraining the machine-learning-logo classifier 304.

As shown in FIG. 3B, in some embodiments, the logo-detection-training system 100 can identify the candidate logo images 314a-314n from image-search results 312 related to a logo class. For example, in some embodiments, the logo-detection-training system 100 uses a search engine to perform an image search based on one or more terms related to a particular logo class. Because the logo class can correspond to a brand, corporation, organization, product, person, service, object, or entity, the search terms for the image search may likewise include a name of the brand, corporation, organization, product, person, service, object or entity.

After receiving the image-search results 312, in some implementations, the logo-detection-training system 100 downloads some or all of the images within the image-search results 312 (e.g., the initial 200 images or the initial 1,000 images) as the candidate logo images 314a-314n. For instance, the logo-detection-training system 100 may download such images using an application programming interface ("API") associated with the search engine.

In addition (or in the alternative) to using a search engine to obtain the image-search results 312, in certain implementations, the logo-detection-training system 100 uses a social networking system to perform an image search based on one or more terms related to the particular logo class. In some such cases, the logo-detection-training system 100 likewise downloads images using an API associated with the social networking system.

Regardless of the method underlying the image-search results 312, in some cases, the logo-detection-training system 100 de-duplicates images from the image-search results 312. For instance, the logo-detection-training system 100 can determine average-pixel values for each image within the image-search results 312 and identify images as duplicates when the images satisfy an average-pixel-value threshold. But the logo-detection-training system 100 can apply any suitable de-duplication algorithm, such as Scale-Invariant Feature Extraction ("SIFT") based de-duplication or Speeded Up Robust Features ("SURF") based de-duplication. After applying a de-duplication algorithm to the images within the image-search results 312, the logo-detection-training system 100 removes duplicate images from images in the image-search results 312 as part of identifying the candidate logo images 314a-314n.

As suggested above, in certain implementations, the candidate logo images 314a-314n derived from the image-search results 312 constitute weakly labelled data. Such images may be weakly labelled because—before application of the machine-learning-logo classifier 304—the images lack object-level-bounding boxes or other boundary identifiers indicating positions of logos. Despite initially lacking such boundary identifiers, the logo-detection-training system 100 can use such candidate logo images as a basis for generating ground-truth data by, for example, applying the machine-learning-logo classifier 304.

As further shown in FIG. 3B, the logo-detection-training system 100 iteratively applies the machine-learning-logo classifier 304 to the candidate logo images 314a-314n to generate the logo predictions 316a-316n. Consistent with the disclosure above, each logo prediction from the logo predictions 316a-316n may include one or both of (i) a logo score indicating a likelihood that a candidate logo image portrays a logo corresponding to a logo class and (ii) a boundary identifier indicating a position of the logo within the candidate logo image. But the logo predictions 316a-316n may take the form of any embodiment described above or below.

After determining the logo predictions 316a-316n, the logo-detection-training system 100 selects the subset of candidate logo images 318 from among the candidate logo images 314a-314n based on logo scores. For example, in certain implementations, the logo-detection-training system 100 identifies and selects candidate logo images corresponding to a threshold number of the highest logo scores for the particular logo class from among the candidate logo images 314a-314n (e.g., highest 200 or 500 logo scores). Alternatively, in one or more embodiments, the logo-detection-training system 100 arbitrarily identifies a threshold number of candidate logo images corresponding to a logo score for the particular logo class more than (or equal to) a threshold logo score.

Figure 5A:
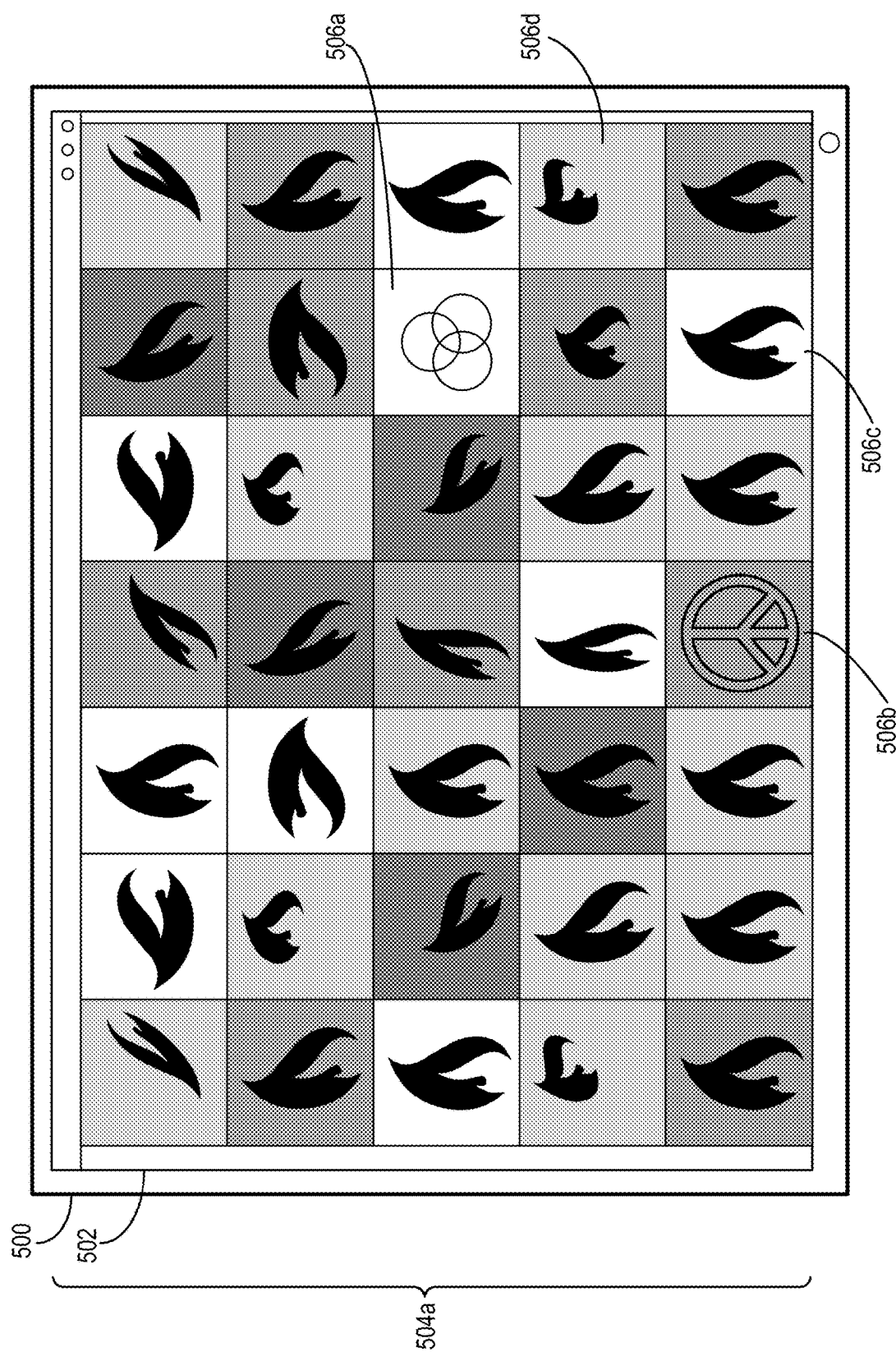
FIGS. 5A-5B illustrate a computing device presenting a curation user interface comprising candidate logos from a subset of candidate logo images corresponding to a logo class in accordance with one or more embodiments.
Figure 5B:
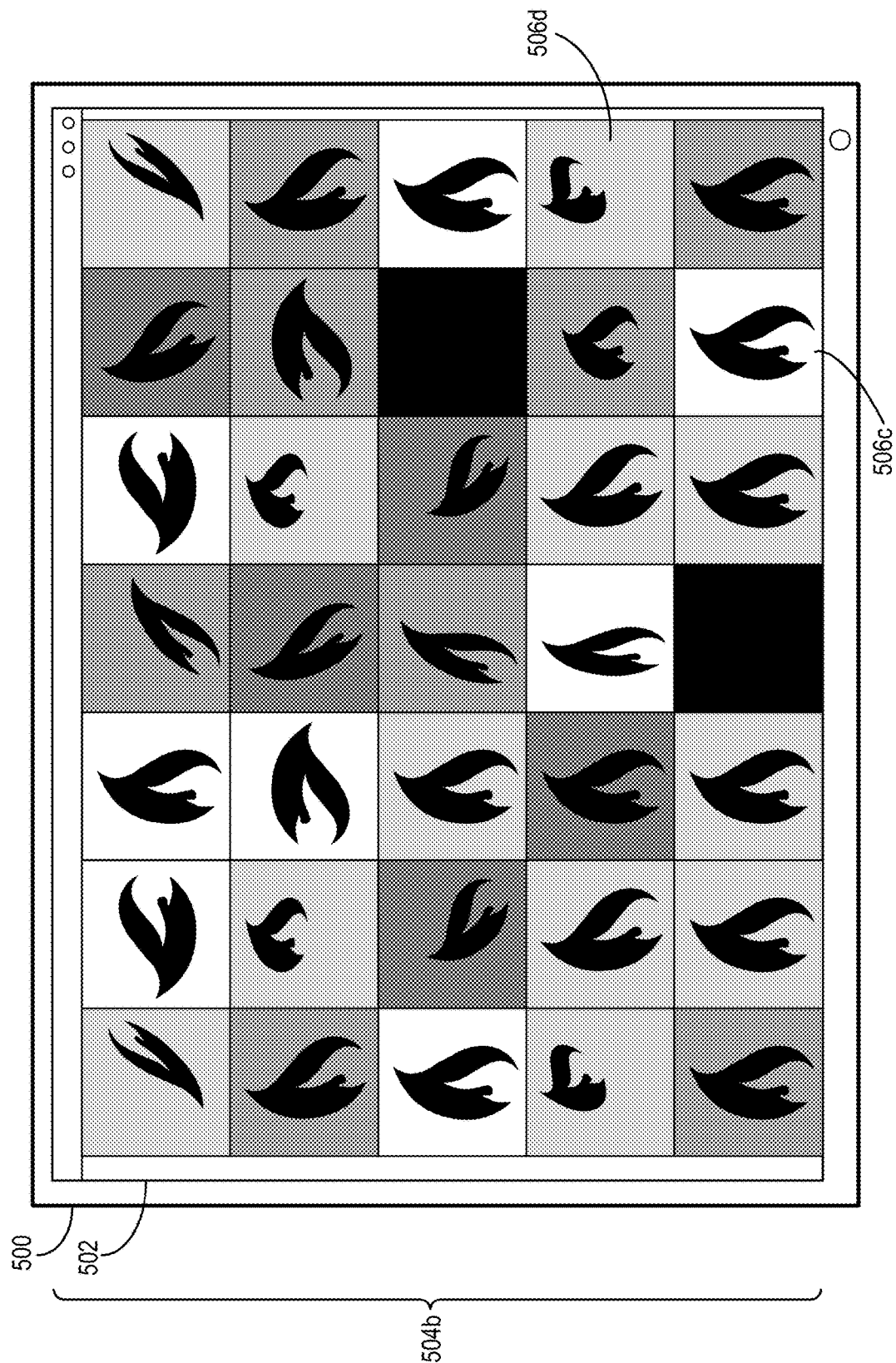

As further shown in FIG. 3B, the logo-detection-training system 100 can augment selection of the subset of candidate logo images 318 by including user curation 320. In some embodiments, for example, the logo-detection-training system 100 provides a curation user interface within a computing device. Within such a curation user interface, the logo-detection-training system 100 further provides (i) candidate logos from the subset of candidate logo images 318 and (ii) a logo-rejection option corresponding to each candidate logo image from the subset of candidate logo images 318. FIGS. 5A and 5B include examples of a curation user interface. Upon receiving an indication of a user selection of a logo-rejection option, the logo-detection-training system 100 removes a corresponding candidate logo image from the subset of candidate logo images 318.

As suggested above, the logo-detection-training system 100 can remove any candidate logo image from the subset of candidate logo images 318 based on detecting a selection of a corresponding logo-rejection option. After providing candidate logos from each candidate logo image within a subset—and removing any rejected candidate logo images—the logo-detection-training system 100 can generate a modified subset of candidate logo images.

As further shown in FIG. 3B, the logo-detection-training system 100 selects the subset of logo images 322 based on the subset of candidate logo images 318. In some embodiments, the logo-detection-training system 100 selects the subset of candidate logo images 318 (without curation) as the subset of logo images 322. Alternatively, in certain implementations, the logo-detection-training system 100 selects a modified subset of candidate logo images (after the user curation 320) as the subset of logo images 322.

Regardless of the form of selection, the subset of logo images 322 can correspond to ground-truth logos. Because each candidate logo image from the subset of candidate logo images 318 corresponds to a logo prediction, the logo-detection-training system 100 generates logo predictions for each candidate logo image from the subset of logo images 322. In some embodiments, such logo predictions constitute ground-truth logos as digital annotations to the subset of logo images 322. As the logo-detection-training system 100 performs further iterations and retrains the machine-learning-logo classifier 304, however, the logo-detection-training system 100 may modify or update the ground-truth logos corresponding to the subset of logo images 322.

As suggested above, the logo-detection-training system 100 uses a machine-learning-logo classifier to incrementally replace subsets of synthetic training images with subsets of logo images until replacing each synthetic training image with a logo image. In accordance with one or more embodiments, FIG. 3C illustrates the logo-detection-training system 100 replacing a subset of synthetic training images with a subset of logo images to generate a set of mixed training images 324. After replacing the subset of synthetic training images, FIG. 3C further depicts the logo-detection-training system 100 retraining the machine-learning-logo classifier 304 based on the set of mixed training images 324.

As shown in FIG. 3C, the logo-detection-training system 100 replaces a subset of synthetic training images from the synthetic training images 302a-302n with the subset of logo images 322. As indicated by FIG. 3C, for example, in some cases, the logo-detection-training system 100 replaces a subset of synthetic training images comprising, but not limited to, the synthetic training image 302a with the subset of logo images 322. Such a replaced subset of synthetic training images may include various numbers of synthetic training images, such as one hundred or five hundred synthetic training images. After replacement, the logo-detection-training system 100 identifies the set of mixed training images comprising both the subset of logo images 322 and remaining synthetic training images from the synthetic training images 302a-302n.

To retrain the machine-learning-logo classifier 304, the logo-detection-training system 100 iteratively inputs images from the set of mixed training images 324 into the machine-learning-logo classifier 304. As suggested by FIG. 3C, the logo-detection-training system 100 iteratively applies a machine-learning-logo classifier 304 to generate logo predictions 326 corresponding to a logo class for images from the set of mixed training images 324. The logo-detection-training system 100 further compares the logo predictions 326 to ground-truth logos 328 corresponding to the logo class to determine logo-prediction losses from the loss function 308. By iteratively generating and comparing logo predictions to ground-truth logos for each image from the set of mixed training images 324, the logo-detection-training system 100 adjusts the internal parameters for and retrains the machine-learning-logo classifier 304 to detect logos within images corresponding to the particular logo class.

As suggested above, in some training iterations shown in FIG. 3C, the logo-detection-training system 100 utilizes a logo image from the set of mixed training images 324. In a given training iteration, for instance, the logo-detection-training system 100 generates a logo prediction for a logo image. The logo-detection-training system 100 further compares the logo prediction to a ground-truth logo corresponding to the logo image using the loss function 308 and modifies internal parameters of the machine-learning-logo classifier 304 based on a determined logo-prediction loss.

In another given training iteration, by contrast, the logo-detection-training system 100 generates a logo prediction for a synthetic training image from the set of mixed training images 324. The logo-detection-training system 100 further compares the logo prediction to a ground-truth logo corresponding to the synthetic training image using the loss function 308 and modifies internal parameters of the machine-learning-logo classifier 304 based on a determined logo-prediction loss.

By iteratively determining logo-prediction losses from a comparison of logo predictions and ground-truth logos, the logo-detection-training system 100 retrains the machine-learning-logo classifier 304 to classify logos corresponding to a particular logo class from images (e.g., real images) and to identify logo positions within such images. In some cases, the logo-detection-training system 100 performs training iterations until having output a logo prediction and determined a corresponding logo-prediction loss for each of the set of mixed training images 324. Alternatively, in one or more embodiments, the logo-detection-training system 100 performs training iterations until the value or weights of the machine-learning-logo classifier 304 do not change significantly across training iterations or otherwise satisfy a convergence criteria.

As suggested above, in certain implementations, the logo-detection-training system 100 repeats the process illustrated in FIGS. 3B and 3C until replacing each synthetic training image with a logo image. Through multiple replacement iterations, the logo-detection-training system 100 replaces subsets from the synthetic training images 302a-302n with subsets of logo images—until no synthetic training images remain. Upon replacing each synthetic training image with a logo image, the logo-detection-training system 100 identifies a set of logo images. Because the machine-learning-logo classifier 304 determined a logo prediction for each candidate logo image that became a logo image in at least one of the multiple training iterations, the logo-detection-training system 100 identifies a ground-truth logo corresponding to each logo image.

Figure 4:
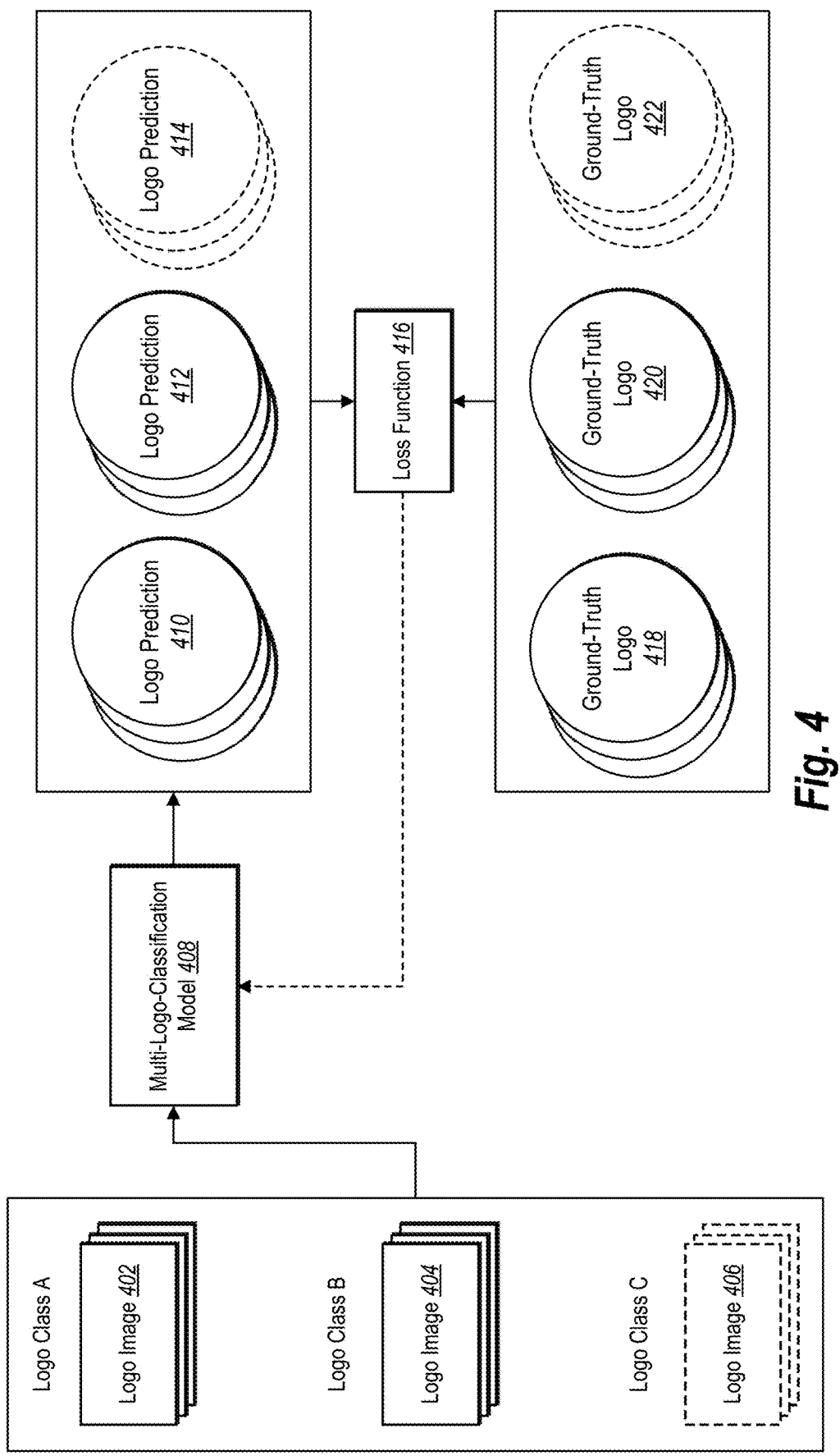
FIG. 4 illustrates the logo-detection-training system training a multi-logo-classification model based on logo images corresponding to different logo classes in accordance with one or more embodiments.

As noted above, in some implementations, the logo-detection-training system 100 can further select and use logo images corresponding to different logo classes to train a multi-logo-classification model. FIG. 4 illustrates the logo-detection-training system 100 training a multi-logo-classification model 408 based on logo images corresponding to different logo classes in accordance with one or more embodiments.

As shown in FIG. 4, the multi-logo-classification model 408 can comprise layers or other architecture from the machine-learning models described above. For example, in some embodiments, the logo-detection-training system 100 uses a Faster R-CNN or other CNN as the multi-logo-classification model 408. Alternatively, the logo-detection-training system 100 uses an SSD, YOLO detection system, or a Fast YOLO detection system as the multi-logo-classification model 408. In addition (or in the alternative) to these machine-learning-model examples, the logo-detection-training system 100 may use any suitable machine-learning model as the multi-logo-classification model 408.

As further shown in FIG. 4, the logo-detection-training system 100 iteratively inputs logo images corresponding to different logo classes into the multi-logo-classification model 408—including logo images corresponding to Logo Class A and Logo Class B. Each logo image corresponds to a ground-truth logo. For example, a logo image 402 from Logo Class A corresponds to a ground-truth logo 418, and a logo image 404 from Logo Class B corresponds to a ground-truth logo 420. Logo Classes A and B are merely examples for purposes of illustration. In certain embodiments, the logo-detection-training system 100 trains the multi-logo-classification model 408 using logo images corresponding to more logo classes.

In some training iterations shown in FIG. 4, the logo-detection-training system 100 inputs a logo image corresponding to Logo Class A. For example, in a given training iteration, the logo-detection-training system 100 generates a logo prediction 410 for the logo image 402. The logo-detection-training system 100 further (i) compares the logo prediction 410 to the ground-truth logo 418 corresponding to the logo image 402 using a loss function 416 and (ii) modifies internal parameters of the multi-logo-classification model 408 based on a determined logo-prediction loss.

In some other training iterations, by contrast, the logo-detection-training system 100 inputs a logo image corresponding to Logo Class B. For example, in a given training iteration, the logo-detection-training system 100 generates a logo prediction 412 for the logo image 404. The logo-detection-training system 100 further (i) compares the logo prediction 412 to the ground-truth logo 420 corresponding to the logo image 404 using the loss function 416 and (ii) modifies internal parameters of the multi-logo-classification model 408 based on a determined logo-prediction loss.

As shown in FIG. 4, the loss function 416 may constitute any loss function described above. To determine a logo-prediction loss for the multi-logo-classification model 408, the logo-detection-training system 100 can, for instance, determine a classification loss based on a comparison of a logo score and a ground-truth-logo label. In some cases, the logo-detection-training system 100 further determines a regression loss based on a comparison of a boundary identifier and a ground-truth-boundary identifier. As described above, however, the logo-detection-training system 100 may utilize a classification-loss function, a regression-loss function, a softmax-loss-function, a binary-cross-entropy-loss function, a cross-entropy-loss function, a mean-squared-error-loss function, or other suitable loss function as the loss function 416 or, when applying an overall-loss function, as part of the loss function 416.

As suggested above, in certain implementations, the logo-detection-training system 100 can retrain the multi-logo-classification model 408 to detect logos corresponding to additional logo classes—after training the multi-logo-classification model 408 to detect logos corresponding to Logo Classes A and B. Because the logo-detection-training system 100 can utilize a machine-learning-logo classifier specific to a logo class to select logo images corresponding to such a logo class, the logo-detection-training system 100 can subsequently select additional logo images corresponding to an additional logo class using an independently trained machine-learning-logo classifier. Such additional logo images and corresponding ground-truth logos can subsequently provide ground-truth data for retraining a multi-logo-classification model to detect additional logos.

As shown in FIG. 4, for example, the logo-detection-training system 100 can retrain the multi-logo-classification model 408 to detect logos corresponding to Logo Class C. When retraining, the logo-detection-training system 100 may iteratively input logo images corresponding to Logo Class C alone or, alternatively, iteratively input logo images corresponding to Logo Classes A, B, and C. In a given training iteration, for instance, the logo-detection-training system 100 generates a logo prediction 414 for a logo image 406. The logo-detection-training system 100 further (i) compares the logo prediction 414 to a ground-truth logo 422 corresponding to the logo image 404 using the loss function 416 and (ii) modifies internal parameters of the multi-logo-classification model 408 based on a determined logo-prediction loss.

By iteratively determining logo-prediction losses from a comparison of logo predictions and ground-truth logos, the logo-detection-training system 100 trains (or retrains) the multi-logo-classification model 408 to detect logos corresponding to different logo classes from images (e.g., images) and to identify logo positions within such images. In some cases, the logo-detection-training system 100 performs training iterations until having output a logo prediction and determined a corresponding logo-prediction loss for each image corresponding to Logo Classes A and B during initial training iterations; for each image corresponding to Logo Classes A, B, and C during retraining iterations according to some embodiments; or for each image corresponding to Logo Class C during retraining iterations according to some embodiments. Alternatively, in one or more embodiments, the logo-detection-training system 100 performs training iterations (or retraining iterations) until the value or weights of the multi-logo-classification model 408 do not change significantly across training iterations or otherwise satisfy a convergence criteria.

As noted above, the logo-detection-training system 100 improves the accuracy with which logo-detection systems recognize logos corresponding to a particular logo class. To test the improved accuracy of the logo-detection-training system 100, researchers compared (i) a multi-logo-classification model trained without user curation, (ii) a multi-logo-classification model trained with user curation, and (iii) a neural network trained using an existing training pipeline, Scalable Logo Self Training ("SLST"). For both of the multi-logo-classification models in the comparison, the logo-detection-training system 100 trained a Faster R-CNN comprising a ResNet-101 architecture as described by Ren, where the ResNet-101 had been pre-trained using a Common Objects in Context ("COCO") dataset. As part of training both of the different multi-logo-classification models in the comparison, the logo-detection-training system 100 generated and incrementally replaced two hundred synthetic training images corresponding to different logo classes and set a learning rate of 0.0001. By contrast, the researchers trained the neural network using SLST as described by Hang Su et al., "Weblogo-2m: Scalable Logo Detection by Deep Learning from the Web," *Proceedings of the Institute of Electrical and Electronic Engineers Conf. on Computer Vision and Pattern Recognition* 270-279 (2017), the entire contents of which are incorporated by reference.

To generate the results shown in Table 1 below, the researchers applied both of the multi-logo-classification models trained by the logo-detection-training system 100 and the SLST-trained neural network to 3,460 test images independently labelled with ground-truth data. To determine the accuracy of each model in detecting logos from different logo classes in the test images, the researchers determined a mean Average Precision ("mAP"). By convention, the researchers applied a 0.5 IoU rule in which detection is considered correct if the Intersection over Union ("IoU") between the detected logo and the ground-truth logo exceeds 50%.

TABLE 1

| Model | mAP |
| --- | --- |
| Multi-Logo-Classification Model - No User Curation | 0.74 |
| Multi-Logo-Classification Model - User Curation | 0.81 |
| SLST | 0.69 |

As shown in Table 1, both of the multi-logo-classification models trained by example embodiments of the logo-detection-training system 100 demonstrated more accurate logo detection in terms of mAP than the neural network trained by SLST. By adding user curation, the multi-logo-classification model trained by the logo-detection-training system 100 improved logo detection in terms of mAP by avoiding model drift. The neural network trained by SLST demonstrated less logo-detection accuracy because the SLST's use of synthetic images for training impedes the neural network from accurately detecting logos in real-world images. Further, without user curation, the SLST foments model drift by propagating errors in logo prediction through training iterations into the final neural network.

As noted above, in some embodiments, the logo-detection-training system 100 provides a curation user interface for display within a computing device to facilitate user curation of candidate logo images. In accordance with one or more embodiments, FIGS. 5A and 5B illustrate a client device 500 presenting curation user interfaces comprising candidate logos corresponding to candidate logo images selected by the logo-detection-training system 100. As described below, FIGS. 5A and 5B depict graphical user interfaces from the perspective of the client device 500 implementing computer-executable instructions from an image-analysis application to perform certain actions for the logo-detection-training system 100.

As shown in FIG. 5A, for instance, the client device 500 presents a curation user interface 504a of an image-analysis application within a screen 502. The curation user interface 504a includes an image array of candidate logos from candidate logo images. For example, candidate-logo thumbnails 506a, 506b, 506c, and 506d each include a candidate logo from a candidate logo image. In some embodiments, such candidate logos correspond to a bounding box from a candidate logo image. While the candidate-logo thumbnails 506c and 506d each include a candidate logo corresponding to a particular logo class, the candidate-logo thumbnails 506a and 506b include candidate logos that do not correspond to the particular logo class.

As indicated above, the logo-detection-training system 100 selects the candidate logo images corresponding to the candidate logos within the curation user interface 504a as part of a subset of candidate logo images. Consistent with the disclosure above, in certain implementations, the logo-detection-training system 100 selects such a subset of candidate logo images based on logo scores as depicted in FIG. 3B and described above.

In addition to candidate logos, in some embodiments, the curation user interface 504a includes a logo-rejection option corresponding to each candidate logo (and each complementary candidate logo image) shown within the curation user interface 504a. In one or more embodiments, a logo-rejection option is represented by a distinct graphical element visible within a curation user interface. Alternatively, a logo-rejection option can be embedded within a candidate-logo thumbnail without a visibly distinct graphical element. As shown in FIG. 5A, for example, each candidate-logo thumbnail includes an embedded logo-rejection option that (upon user selection) causes the logo-detection-training system 100 to remove a corresponding candidate logo image from a subset of candidate logo images.

As indicated by a comparison of FIG. 5A and FIG. 5B, the client device 500 detects user selections of logo-rejection options corresponding to the candidate-logo thumbnails 506a and 506b by detecting user selections of the candidate-logo thumbnails 506a and 506b. By contrast, in some embodiments, a client device can detect user selections of logo-rejection options corresponding to candidate-logo thumbnails by detecting user selections of distinct and visible graphical elements representing logo-rejection options. Upon receiving an indication of user selections of the logo-rejection options corresponding to the candidate-logo thumbnails 506a and 506b, the logo-detection-training system 100 removes corresponding candidate logo images from a subset of candidate logo images.

As shown in FIG. 5B, for example, the client device 500 presents a curation user interface 504b of the image-analysis application within the screen 502—after detecting selections of logo-rejection options. Based on detecting user selections of logo-rejection options embedded within the candidate-logo thumbnails 506a and 506b, the client device 500 removes the candidate-logo thumbnails 506a and 506b and sends an indication to the logo-detection-training system 100 to remove candidate logo images corresponding to the candidate-logo thumbnails 506a and 506b from a subset of candidate logo images. By providing such a curation user interface, the logo-detection-training system 100 facilitates a flexible and user-friendly interface through which a user can easily review and remove incorrectly detected logos from candidate logo images.

Figure 6:
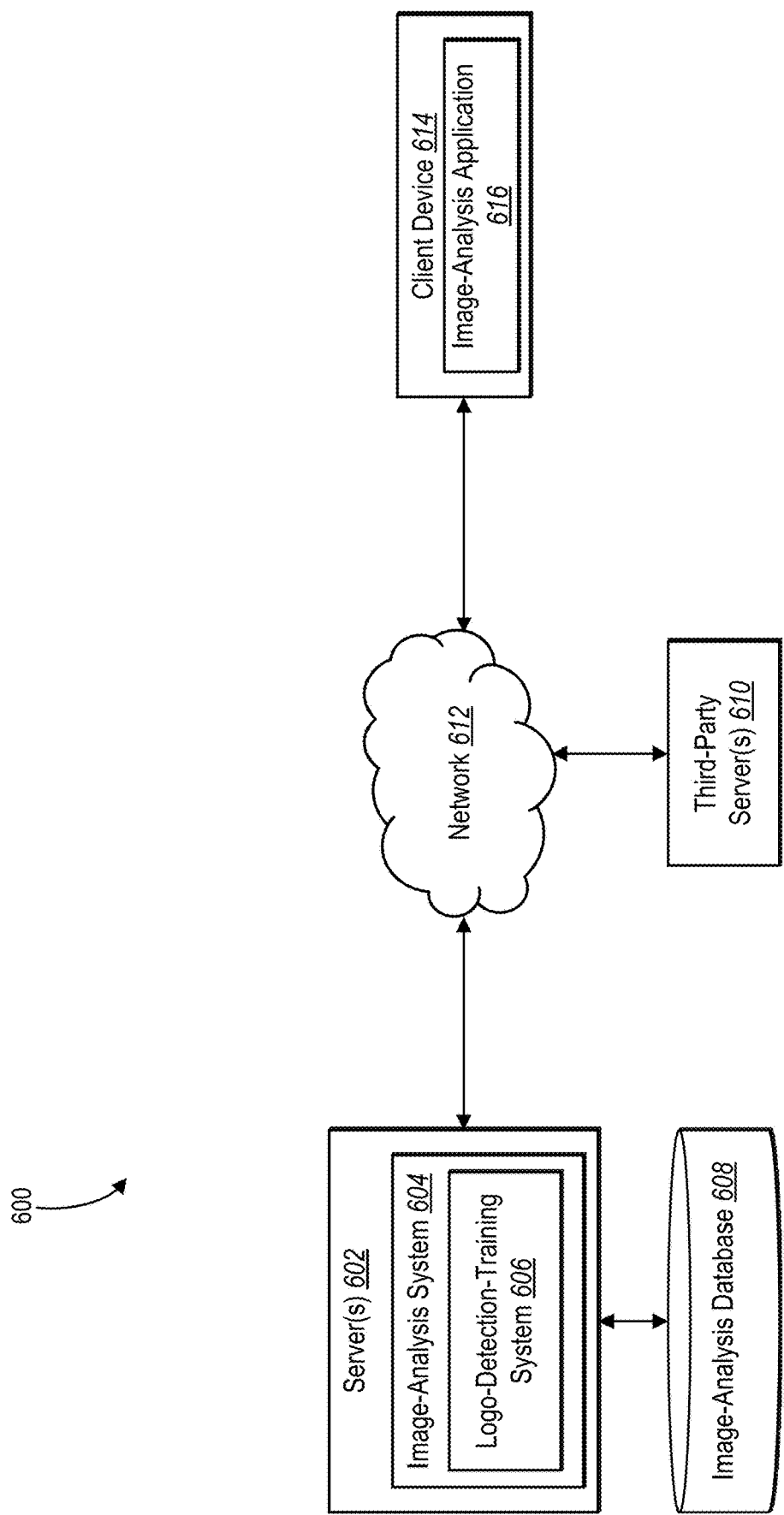
FIG. 6 illustrates a block diagram of an environment in which an image classification system and a logo-detection-training system can operate in accordance with one or more embodiments.
Figure 7:
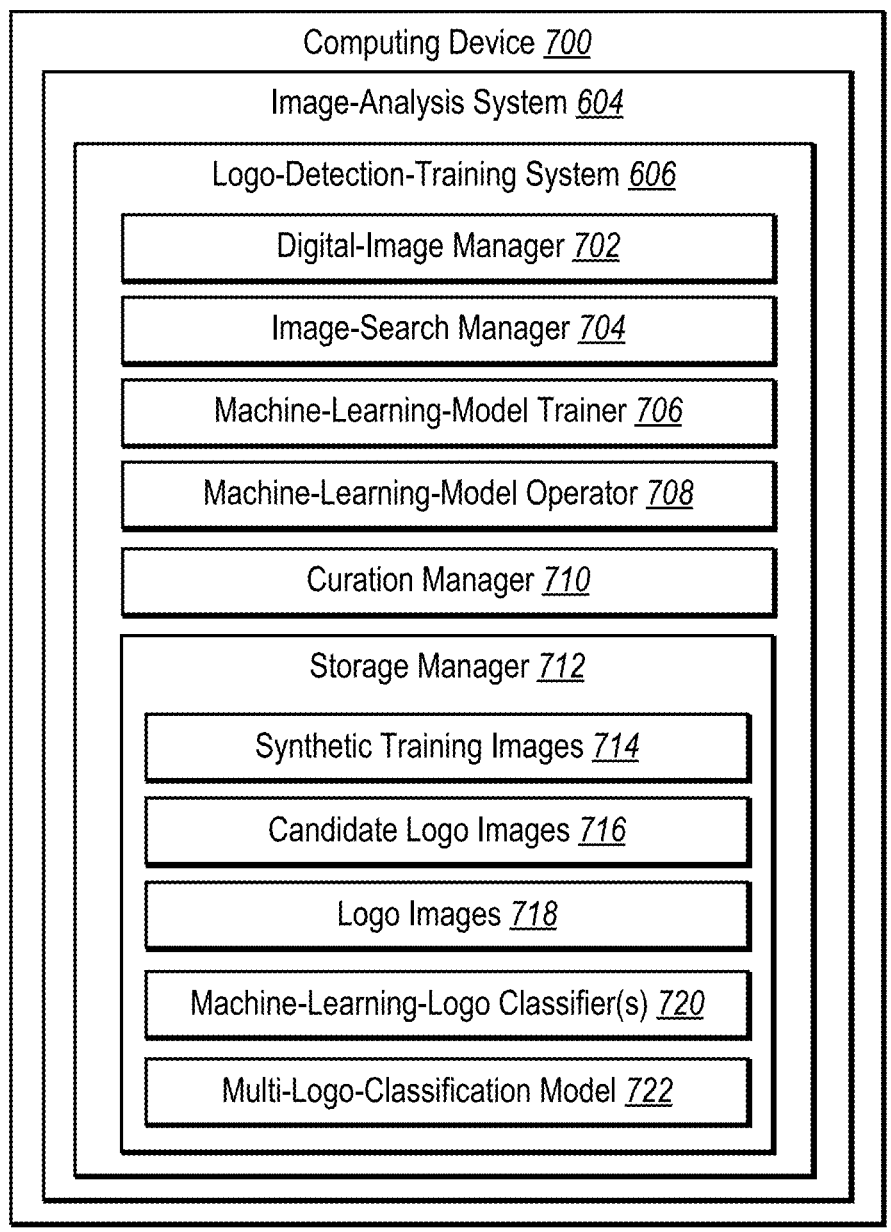
FIG. 7 illustrates a schematic diagram of the image classification system and the logo-detection-training system of FIG. 6 in accordance with one or more embodiments.

Turning now to FIGS. 6 and 7, these figures provide an overview of an environment in which a logo-detection-training system can operate and an example of an architecture for the logo-detection-training system. In particular, FIG. 6 depicts a block diagram illustrating an exemplary system environment ("environment") 600 in which a logo-detection-training system 606 can operate in accordance with one or more embodiments. Specifically, FIG. 6 illustrates the environment 600 comprising server(s) 602, third-party server(s) 610, a network 612, and a client device 614. Although FIG. 6 illustrates one client device and one user, in alternative embodiments, the environment 600 can include various numbers of computing devices and associated users. Similarly, although FIG. 6 illustrates a particular arrangement of the server(s) 602, the third-party server(s) 610, the network 612, and the client device 614, various additional arrangements are possible.

As shown in FIG. 6, the server(s) 602, the third-party server(s) 610, the network 612, and the client device 614 may be communicatively coupled with each other either directly or indirectly, such as coupling through the network 612, which is described further below in relation to FIG. 8. The server(s) 602 and the client device 614 may include various types of computing devices, including one or more computing devices as discussed further below in relation to FIG. 8.

As depicted in FIG. 6, the server(s) 602 can generate, store, receive, and/or transmit a variety of types of data, including inputs of synthetic training images, candidate logo images, or logo images into neural networks or user inputs corresponding to a curation user interface. For example, the logo-detection-training system 606 in conjunction with the server(s) 602 can receive indications for the client device 614 of user selections of logo-rejection options via a curation user interface. In some embodiments, the server(s) 602 comprise a data server, a communication server, or a web-hosting server.

As further shown in FIG. 6, the server(s) 602 can include an image-analysis system 604. In general, the image-analysis system 604 facilitates the analysis, generation, modification, sharing, accessing, storing, and/or deletion of digital images. For example, the image-analysis system 604 can use the server(s) 602 to analyze digital images and detect logos within such images. In certain implementations, the image-analysis system 604 uses the server(s) 602 to receive user inputs identifying logos, synthetic training images, candidate logo images, logo images, or other digital images from the client device 614 or transmit data representing logos, synthetic training images, candidate logo images, logo images, or other digital images to the client device 614.

In addition to the image-analysis system 604, the server(s) 602 include the logo-detection-training system 606. The logo-detection-training system 606 is an embodiment (and can perform the functions, methods, and processes) of the logo-detection-training system 100 described above. In some embodiments, for example, the logo-detection-training system 606 in conjunction with the server(s) 602 can train a machine-learning-logo classifier based on synthetic training images comprising logos corresponding to a logo class. Additionally, in some cases, the logo-detection-training system 606 in conjunction with the server(s) 602 communicate with the third-party server(s) 610 to perform image searches and download images to identify candidate logo images.

As suggested above, the logo-detection-training system 606 in conjunction with the server(s) 602 may further apply the machine-learning-logo classifier to candidate logo images to select a subset of logo images. By replacing a subset of synthetic training images with the subset of logo images, the logo-detection-training system 606 in conjunction with the server(s) 602 can generate a set of mixed training images. By incrementally replacing the synthetic training images with selected candidate logo images, the logo-detection-training system 606 in conjunction with the server(s) 602 select logo images comprising ground-truth logos corresponding to the logo class using the retrained machine-learning-logo classifier.

As suggested by previous embodiments, the logo-detection-training system 606 can be implemented in whole or in part by the individual elements of the environment 600. Although FIG. 6 illustrates the logo-detection-training system 606 implemented within the server(s) 602, components of the logo-detection-training system 606 can be implemented in other components of the environment 600. For instance, in some embodiments, the client device 614 comprises the logo-detection-training system 108 and performs all of the functions, methods, and processes of the logo-detection-training system 606 described above and below. This disclosure describes example components of the logo-detection-training system 606 further below (e.g., with regard to FIG. 7).

As further shown in FIG. 6, in some embodiments, the client device 614 comprises a computing device that allows a user to send and receive digital communications. For example, the client device 614 can include a desktop computer, laptop computer, smartphone, tablet, or other electronic device. In some embodiments, the client device 614 further includes one or more software applications (e.g., an image-analysis application 616) that allows a user to send and receive digital communications. For example, the image-analysis application 616 can be a software application installed on the client device 614 or a software application hosted on the server(s) 602. When hosted on the server(s) 602, the image-analysis application 616 may be accessed by the client device 614 through another application, such as a web browser. In some implementations, the image-analysis application 616 includes instructions that, when executed by a processor, cause the client device 614 to present one or more graphical user interfaces, such as curation user interfaces.

As also illustrated in FIG. 6, the image-analysis system 604 is communicatively coupled to an image-analysis database 608. In one or more embodiments, the image-analysis system 604 accesses and queries data from the image-analysis database 608 associated with requests from the logo-detection-training system 606. For instance, the image-analysis system 604 may access logos, synthetic training images, candidate logo images, logo images, or other digital images for the logo-detection-training system 606. As shown in FIG. 6, the image-analysis database 608 is separately maintained from the server(s) 602. Alternatively, in one or more embodiments, the image-analysis system 604 and the image-analysis database 608 comprise a single combined system or subsystem within the server(s) 602.

Turning now to FIG. 7, this figure provides additional detail regarding components and features of the logo-detection-training system 606 in accordance with one or more embodiments. In particular, FIG. 7 illustrates a computing device 700 implementing the image-analysis system 604 and the logo-detection-training system 606. In some embodiments, the computing device 700 comprises one or more servers (e.g., the server(s) 602) and/or one or more client devices (e.g., the client device 614).

As shown in FIG. 7, the computing device 700 includes the image-analysis system 604. In some embodiments, the image-analysis system 604 uses its components to provide tools for analyzing, providing, modifying, storing, and/or deleting digital images. Additionally, in some cases, the image-analysis system 604 facilitates the analysis and selection of logos corresponding to logo classes and training of machine-learning-logo classifiers or multi-logo-classification models.

As further shown in FIG. 7, the computing device 700 includes the logo-detection-training system 606. The logo-detection-training system 606 includes, but is not limited to, a digital-image manager 702, an image-search manager 704, a machine-learning-model trainer 706, a machine-learning-model operator 708, a curation manager 710, and/or a storage manager 712. The following paragraphs describe each of these components in turn.

As just mentioned, the logo-detection-training system 606 includes the digital-image manager 702. The digital-image manager 702 generates, identifies, and receives inputs concerning synthetic training images; and selects and manages candidate logo images or logo images. For example, in some embodiments, the digital-image manager 702 generates synthetic training images corresponding to a logo class. Additionally, in some embodiments, the digital-image manager 702 selects candidate logo images based on logo scores and identifies a set of logo images.

As further shown in FIG. 7, the image-search manager 704 identifies, analyzes, and receives inputs concerning image searches. For example, in some embodiments, the image-search manager 704 automatically identifies search terms for image searches, receives user inputs identifying search terms for image searches, downloads images from image-search results, and de-duplicates images from image-search results. Additionally, in some embodiments, the image-search manager 704 interfaces with a search engine or social networking system to perform image searches.

As further shown in FIG. 7, the machine-learning-model trainer 706 trains one or both of machine-learning-logo classifier(s) 720 and a multi-logo-classification model 722. For example, in some embodiments, the machine-learning-model trainer 706 trains the machine-learning-logo classifier(s) 720 as illustrated in FIG. 1, 3A, or 3C, respectively. As a further example, in some embodiments, the machine-learning-model trainer 706 trains the multi-logo-classification model 722 as illustrated in FIG. 4. In some embodiments, the machine-learning-model trainer 706 further communicates with the storage manager 712 to generate, select, apply, and/or access synthetic training images 714, candidate logo images 716, logo images 718, the machine-learning-logo classifier(s) 720, and/or the multi-logo-classification model 722.

As further shown in FIG. 7, the machine-learning-model operator 708 applies a trained version of one or both of the machine-learning-logo classifier(s) 720 and the multi-logo-classification model 722. For example, in some embodiments, the machine-learning-model operator 708 applies the machine-learning-logo classifier(s) 720 as illustrated in FIG. 1 or 3B, respectively. As another example, in some embodiments, the machine-learning-model operator 708 applies the multi-logo-classification model 722 to detect logos corresponding to different logo classes from images and to identify logo positions within such images. In some embodiments, the machine-learning-model operator 708 further communicates with the storage manager 712 to apply and/or access the logo images 718, the machine-learning-logo classifier(s) 720, and/or the multi-logo-classification model 722.

In addition to the machine-learning-model operator 708, in some embodiments, the logo-detection-training system 606 further comprises the curation manager 710. The curation manager 710 provides or renders candidate logos from the candidate logo images within a curation user interface, such as the curation user interfaces shown in FIGS. 5A and 5B. In certain implementations, the curation manager 710 also removes candidate logo image from a subset of candidate logo images based on receiving indications of user selections of logo-rejection options.

In one or more embodiments, each of the components of the logo-detection-training system 606 are in communication with one another using any suitable communication technologies. Additionally, the components of the logo-detection-training system 606 can be in communication with one or more other devices including one or more client devices described above. Although the components of the logo-detection-training system 606 are shown to be separate in FIG. 7, any of the subcomponents may be combined into fewer components, such as into a single component, or divided into more components as may serve a particular implementation. Furthermore, although the components of FIG. 7 are described in connection with the logo-detection-training system 606, at least some of the components for performing operations in conjunction with the logo-detection-training system 606 described herein may be implemented on other devices within the environment 600.

Each of the components 702-722 of the logo-detection-training system 606 can include software, hardware, or both. For example, the components 702-722 can include one or more instructions stored on a computer-readable storage medium and executable by processors of one or more computing devices, such as a client device or server device. When executed by the one or more processors, the computer-executable instructions of the logo-detection-training system 606 can cause the computing device(s) to perform the methods described herein. Alternatively, the components 702-722 can include hardware, such as a special-purpose processing device to perform a certain function or group of functions. Alternatively, the components 702-722 of the logo-detection-training system 606 can include a combination of computer-executable instructions and hardware.

Furthermore, the components 702-722 of the logo-detection-training system 606 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 702-722 may be implemented as a stand-alone application, such as a desktop or mobile application. Furthermore, the components 702-722 may be implemented as one or more web-based applications hosted on a remote server. The components 702-722 may also be implemented in a suite of mobile device applications or "apps." To illustrate, the components 702-722 may be implemented in a software application, including, but not limited to, ADOBE ILLUSTRATOR, ADOBE EXPERIENCE DESIGN, ADOBE CREATIVE CLOUD, ADOBE PHOTOSHOP, or ADOBE SENSEI. "ADOBE," "ILLUSTRATOR," "EXPERIENCE DESIGN," "CREATIVE CLOUD," "PHOTOSHOP," and "SENSEI" are either registered trademarks or trademarks of Adobe Inc. in the United States and/or other countries.

Figure 8:
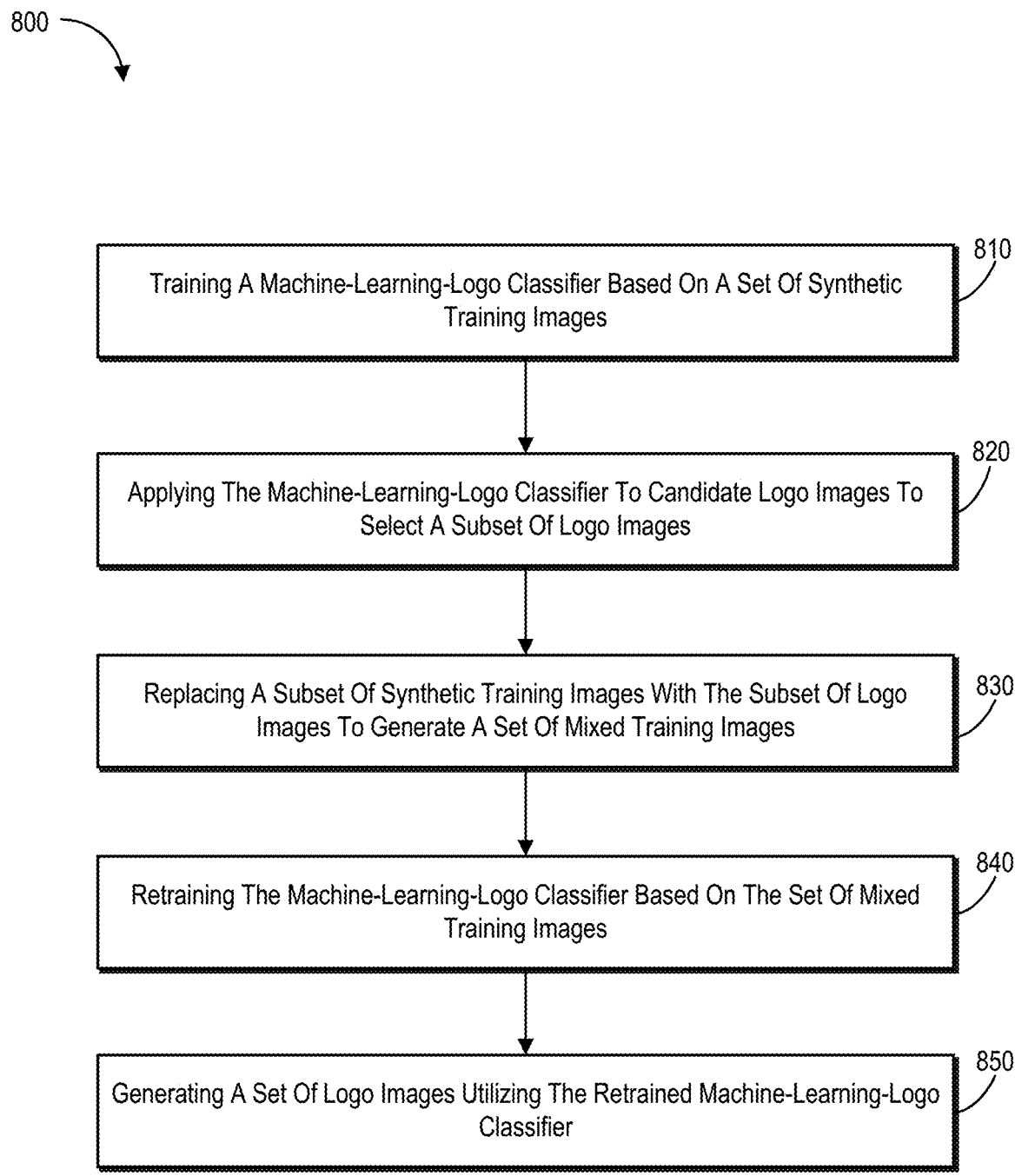
FIG. 8 illustrates a flowchart of a series of acts for training a machine-learning-logo classifier based on synthetic training images and incrementally replacing the synthetic training images with the logo images in accordance with one or more embodiments.

Turning now to FIG. 8, this figure illustrates a flowchart of a series of acts 800 of training a machine-learning-logo classifier based on synthetic training images and incrementally replacing the synthetic training images with the logo images in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by one or more processors, cause a computing device to perform the acts depicted in FIG. 8. In still further embodiments, a system comprising one or more memory devices and one or more server devices can perform the acts of FIG. 8.

As shown in FIG. 8, the acts 800 include an act 810 of training a machine-learning-logo classifier based on a set of synthetic training images. In particular, in some embodiments, the act 810 includes training a machine-learning-logo classifier based on a set of synthetic training images comprising logos corresponding to a logo class. In some cases, the machine-learning-logo classifier comprises a Faster Region-Based Convolutional Neural Network ("Faster R-CNN").

As further shown in FIG. 8, the acts 800 include an act 820 of applying the machine-learning-logo classifier to candidate logo images to select a subset of logo images. In particular, in some embodiments, the act 820 includes applying the machine-learning-logo classifier to a set of candidate logo images to select a subset of logo images.

For instance, in one or more embodiments, applying the machine-learning-logo classifier to the set of candidate logo images to select the subset of logo images comprises: generating logo scores for the set of candidate logo images utilizing the machine-learning-logo classifier, wherein a logo score indicates a likelihood that a candidate logo image portrays a logo corresponding to the logo class; and selecting the subset of logo images from the set of candidate logo images based in part on the logo scores.

As suggested above, in certain implementations, applying the machine-learning-logo classifier to the set of candidate logo images comprises generating boundary identifiers indicating positions of candidate logos within the set of candidate logo images utilizing the machine-learning-logo classifier.

As further shown in FIG. 8, the acts 800 include an act 830 of replacing a subset of synthetic training images with the subset of logo images to generate a set of mixed training images. In particular, in certain implementations, the act 830 includes replacing a subset of synthetic training images with the subset of logo images to generate a set of mixed training images.

As further shown in FIG. 8, the acts 800 include an act 840 of retraining the machine-learning-logo classifier based on the set of mixed training images and an act 850 of selecting a set of logo images utilizing the retrained machined-learning-logo classifier. In particular, in certain implementations, the act 850 includes selecting a set of logo images comprising ground-truth logos corresponding to the logo class utilizing the retrained machine-learning-logo classifier. Similarly, in some embodiments, the act 850 includes determining, from the set of candidate logo images, a set of logo images comprising ground-truth logos corresponding to the logo class utilizing the retrained machine-learning-logo classifier.

In addition to the acts 810-850, in certain implementations, the acts 800 include generating ground-truth-boundary identifiers indicating positions of the ground-truth logos within the set of logo images. Additionally, in some cases, the acts 800 further include applying the machine-learning-logo classifier to generate logo scores for the set of candidate logo images; and based on the logo scores, providing, for display within a curation user interface, candidate logos from a subset of candidate logo images from the set of candidate logo images and logo-rejection options corresponding to the subset of candidate logo images.

As suggested above, in certain implementations, the acts 800 further include, after retraining the machine-learning-logo classifier based on the set of mixed training images: applying the machine-learning-logo classifier to an additional set of candidate logo images to select an additional subset of logo images; replacing an additional subset of training images from within the set of synthetic training images with the additional subset of logo images to generate an additional set of mixed training images; and retraining the machine-learning-logo classifier based on the additional set of mixed training images. In some cases, the acts 800 further include, after retraining the machine-learning-logo classifier based on the set of mixed training images: generating additional logo scores for an additional set of candidate logo images utilizing the machine-learning-logo classifier; selecting an additional subset of logo images from the additional set of candidate logo images based on the additional logo scores; replacing an additional subset of synthetic training images from the set of synthetic training images with the additional subset of logo images to generate an additional set of mixed training images; and retraining the machine-learning-logo classifier based on the additional set of mixed training images.

Relatedly, in some cases, the acts 800 further include receiving an indication of a user selection of a logo-rejection option corresponding to a candidate logo image from the subset of candidate logo images; based on the indication of the user selection of the logo-rejection option, removing the candidate logo image from the subset of candidate logo images to generate a modified subset of candidate logo images; and selecting the modified subset of candidate logo images as the subset of logo images.

As further suggested above, in some cases, the acts 800 further include selecting an additional set of logo images comprising additional ground-truth logos corresponding to an additional logo class utilizing an additional machine-learning-logo classifier; and training a multi-logo-classification model based on the set of logo images and the additional set of logo images. Relatedly, in some cases, the acts 800 further include selecting a new set of logo images comprising new ground-truth logos corresponding to a new logo class utilizing a new machine-learning-logo classifier; and training the multi-logo-classification model based on the set of logo images, the additional set of logo images, and the new set of logo images.

As indicated above, in one or more embodiments, the acts 800 further include identifying candidate images from among image-search results generated by a search query corresponding to the logo class; and removing duplicate images from the candidate images based on average-pixel values to generate the set of candidate logo images.

In addition (or in the alternative) to the acts described above, in some embodiments, the acts 800 include performing a step for selecting a set of logo images from the set of candidate logo images utilizing the machine-learning-logo classifier and the set of synthetic training images. For instance, the algorithms and acts described in relation to FIGS. 3B and 3C can comprise the corresponding acts for a step for selecting a set of logo images from the set of candidate logo images utilizing the machine-learning-logo classifier and the set of synthetic training images.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
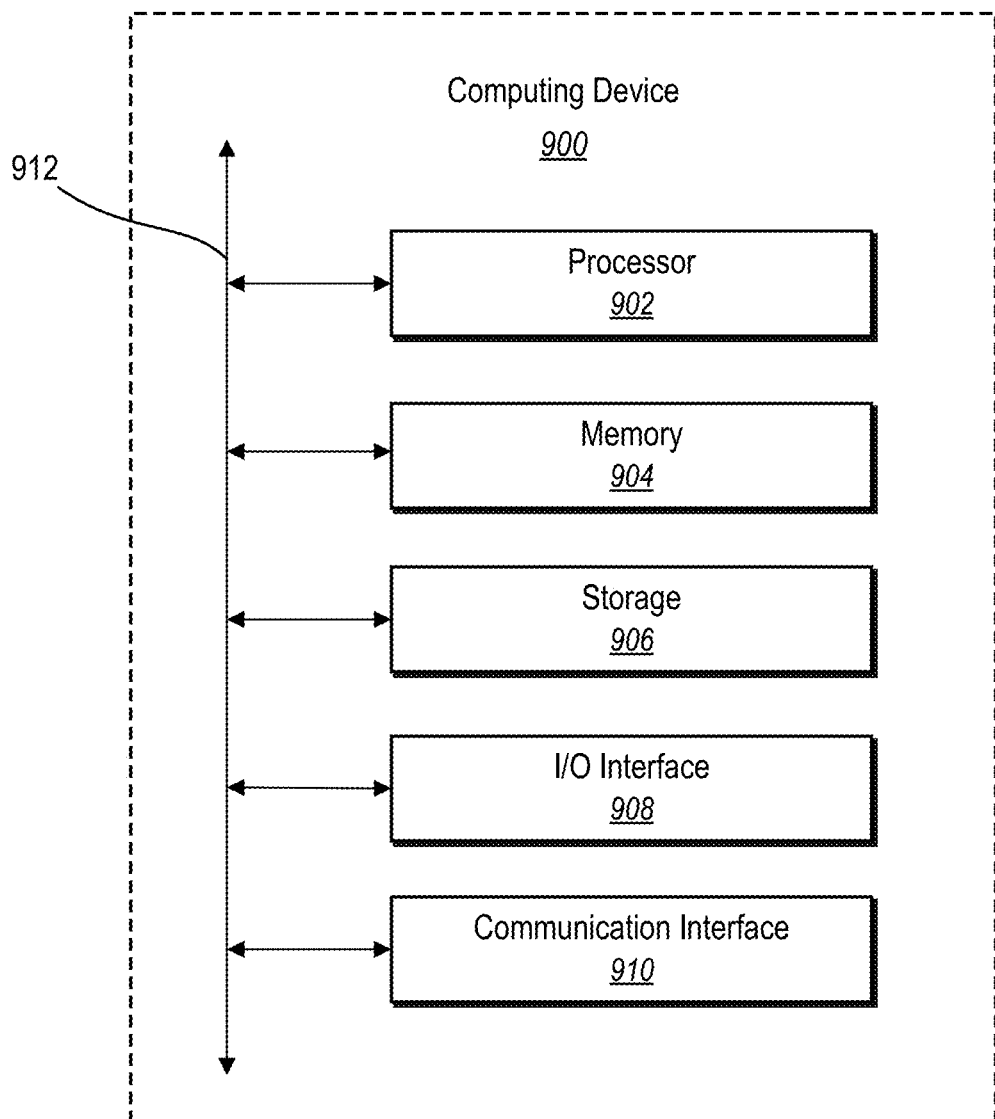
FIG. 9 illustrates a block diagram of an exemplary computing device for implementing one or more embodiments of the present disclosure.

FIG. 9 illustrates a block diagram of exemplary computing device 900 that may be configured to perform one or more of the processes described above. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 700 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for digitizing real-world objects, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions related to object digitizing processes (e.g., digital scans, digital models).

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computing device to:
    train a machine-learning-logo classifier based on a set of synthetic training images comprising logos corresponding to a logo class;
    apply the machine-learning-logo classifier to a set of candidate logo images to select a subset of logo images;
    replace a subset of synthetic training images with the subset of logo images to generate a set of mixed training images;
    retrain the machine-learning-logo classifier based on the set of mixed training images; and
    select a set of logo images comprising ground-truth logos corresponding to the logo class utilizing the retrained machine-learning-logo classifier.

2. The non-transitory computer readable medium of claim 1, further comprising instructions that, when executed by the at least one processor, cause the computing device to apply the machine-learning-logo classifier to the set of candidate logo images to select the subset of logo images by:
    generating logo scores for the set of candidate logo images utilizing the machine-learning-logo classifier, wherein a logo score indicates a likelihood that a candidate logo image portrays a logo corresponding to the logo class; and
    selecting the subset of logo images from the set of candidate logo images based in part on the logo scores.

3. The non-transitory computer readable medium of claim 1, further comprising instructions that, when executed by the at least one processor, cause the computing device to:
    apply the machine-learning-logo classifier to generate logo scores for the set of candidate logo images; and
    based on the logo scores, provide, for display within a curation user interface, candidate logos from a subset of candidate logo images from the set of candidate logo images and logo-rejection options corresponding to the subset of candidate logo images.

4. The non-transitory computer readable medium of claim 1, further comprising instructions that, when executed by the at least one processor, cause the computing device to, after retraining the machine-learning-logo classifier based on the set of mixed training images:
    apply the machine-learning-logo classifier to an additional set of candidate logo images to select an additional subset of logo images;
    replace an additional subset of training images from within the set of synthetic training images with the additional subset of logo images to generate an additional set of mixed training images; and
    retrain the machine-learning-logo classifier based on the additional set of mixed training images.

5. The non-transitory computer readable medium of claim 1, further comprising instructions that, when executed by the at least one processor, cause the computing device to:
    select an additional set of logo images comprising additional ground-truth logos corresponding to an additional logo class utilizing an additional machine-learning-logo classifier; and
    train a multi-logo-classification model based on the set of logo images and the additional set of logo images.

6. The non-transitory computer readable medium of claim 1, further comprising instructions that, when executed by the at least one processor, cause the computing device to apply the machine-learning-logo classifier to the set of candidate logo images by generating boundary identifiers indicating positions of candidate logos within the set of candidate logo images utilizing the machine-learning-logo classifier.

7. The non-transitory computer readable medium of claim 1, further comprising instructions that, when executed by the at least one processor, cause the computing device to:
    identify candidate images from among image-search results generated by a search query corresponding to the logo class; and
    remove duplicate images from the candidate images based on average-pixel values to generate the set of candidate logo images.

8. The non-transitory computer readable medium of claim 5, further comprising instructions that, when executed by the at least one processor, cause the computing device to:

select a new set of logo images comprising new ground-truth logos corresponding to a new logo class utilizing a new machine-learning-logo classifier; and
train the multi-logo-classification model based on the set of logo images, the additional set of logo images, and the new set of logo images.

9. A system comprising:
one or more memory devices comprising a set of synthetic training images comprising logos corresponding to a logo class and a set of candidate logo images; and
one or more server devices that cause the system to:
  train a machine-learning-logo classifier based on the set of synthetic training images;
  generate logo scores for the set of candidate logo images utilizing the machine-learning-logo classifier, wherein a logo score indicates a likelihood that a candidate logo image portrays a logo corresponding to the logo class;
  select a subset of logo images from the set of candidate logo images based on the logo scores;
  replace a subset of synthetic training images from the set of synthetic training images with the subset of logo images to generate a set of mixed training images;
  retrain the machine-learning-logo classifier based on the set of mixed training images; and
  determine, from the set of candidate logo images, a set of logo images comprising ground-truth logos corresponding to the logo class utilizing the retrained machine-learning-logo classifier.

10. The system of claim 9, wherein the one or more server devices further cause the system to, based on the logo scores for the set of candidate logo images, provide, for display within a curation user interface, candidate logos from a subset of candidate logo images from the set of candidate logo images and logo-rejection options corresponding to the subset of candidate logo images.

11. The system of claim 9, wherein the one or more server devices further cause the system to, after retraining the machine-learning-logo classifier based on the set of mixed training images:
  generate additional logo scores for an additional set of candidate logo images utilizing the machine-learning-logo classifier;
  select an additional subset of logo images from the additional set of candidate logo images based on the additional logo scores;
  replace an additional subset of synthetic training images from the set of synthetic training images with the additional subset of logo images to generate an additional set of mixed training images;
  retrain the machine-learning-logo classifier based on the additional set of mixed training images.

12. The system of claim 9, wherein the one or more server devices further cause the system to:
  select an additional set of logo images comprising additional ground-truth logos corresponding to an additional logo class utilizing an additional machine-learning-logo classifier; and
  train a multi-logo-classification model based on the set of logo images and the additional set of logo images.

13. The system of claim 9, wherein the one or more server devices further cause the system to apply the machine-learning-logo classifier to the set of candidate logo images to generate boundary identifiers indicating positions of candidate logos within the set of candidate logo images.

14. The system of claim 9, wherein the one or more server devices further cause the system to:
  identify candidate images from among image-search results generated by a search query corresponding to the logo class; and
  remove duplicate images from the candidate images based on average-pixel values to generate the set of candidate logo images.

15. The system of claim 12, wherein the one or more server devices cause the system to:
  select a new set of logo images comprising new ground-truth logos corresponding to a new logo class utilizing a new machine-learning-logo classifier; and
  retrain the multi-logo-classification model based on the set of logo images, the additional set of logo images, and the new set of logo images.

16. In a digital medium environment for classifying logos from digital images, a computer-implemented method of augmenting training images for logo detection comprising:
  training a machine-learning-logo classifier based on a set of synthetic training images comprising logos corresponding to a logo class;
  identifying a set of candidate logo images;
  performing a step for selecting a set of logo images from the set of candidate logo images utilizing the machine-learning-logo classifier and the set of synthetic training images; and
  provide the set of logo images for training a multi-logo-classification model.

17. The method of claim 16, further comprising providing, for display within a curation user interface, candidate logos from a subset of candidate logo images from the set of candidate logo images and logo-rejection options corresponding to the subset of candidate logo images.

18. The method of claim 16, wherein the machine-learning-logo classifier comprises a Faster Region-Based Convolutional Neural Network ("Faster R-CNN").

19. The method of claim 16, further comprising:
  identifying candidate images from among image-search results generated by a search query corresponding to the logo class; and
  removing duplicate images from the candidate images based on average-pixel values to generate the set of candidate logo images.

20. The method of claim 16, wherein training the machine-learning-logo classifier based on the set of synthetic training images comprises:
  applying the machine-learning-logo classifier to a synthetic training image to generate a logo score indicating a likelihood that the synthetic training image portrays a logo corresponding to the logo class;
  comparing the logo score to a ground-truth logo to determine a logo-prediction loss; and
  adjusting internal parameters of the machine-learning-logo classifier based on the logo-prediction loss.

* * * * *